(12) United States Patent
Van Rozendaal et al.

(10) Patent No.: US 11,924,445 B2
(45) Date of Patent: Mar. 5, 2024

(54) INSTANCE-ADAPTIVE IMAGE AND VIDEO COMPRESSION USING MACHINE LEARNING SYSTEMS

(71) Applicant: QUALCOMM Incorporated, San Diego, CA (US)

(72) Inventors: Ties Jehan Van Rozendaal, Amsterdam (NL); Iris Anne Marie Huijben, Eindhoven (NL); Taco Sebastiaan Cohen, Amsterdam (NL)

(73) Assignee: QUALCOMM INCORPORATED, San Diego, CA (US)

( * ) Notice: Subject to any disclaimer, the term of this patent is extended or adjusted under 35 U.S.C. 154(b) by 488 days.

(21) Appl. No.: 17/201,944

(22) Filed: Mar. 15, 2021

(65) Prior Publication Data

US 2022/0103839 A1 Mar. 31, 2022

Related U.S. Application Data

(60) Provisional application No. 63/083,747, filed on Sep. 25, 2020.

(51) Int. Cl.
*H04N 19/184* (2014.01)
*G06N 3/045* (2023.01)
*G06N 3/088* (2023.01)

(52) U.S. Cl.
CPC .......... *H04N 19/184* (2014.11); *G06N 3/045* (2023.01); *G06N 3/088* (2013.01)

(58) Field of Classification Search
CPC ........ G06N 3/045; G06N 3/088; G06N 3/084; G06N 3/047; H04N 19/184; H04N 19/463; H04N 19/147; H04N 19/91
(Continued)

(56) References Cited

U.S. PATENT DOCUMENTS

2018/0176578 A1* 6/2018 Rippel ............. G06V 30/19167
2020/0304802 A1 9/2020 Habibian et al.

FOREIGN PATENT DOCUMENTS

CN 112052789 A * 12/2020 ......... G06K 9/00288

OTHER PUBLICATIONS

D1:Minnen David et al: "Image-Dependent Local Entropy Models for Learned Image Compression", 25th IEEE International Conference on Image Processing (ICIP), IEEE,Oct. 7, 2018,pp. 430434,XP033455072, DOI: 10.1109/ICIP.2018.8451502 [retrieved on Aug. 29, 2018].*

(Continued)

*Primary Examiner* — Melur Ramakrishnaiah
(74) *Attorney, Agent, or Firm* — Polsinelli LLP

(57) ABSTRACT

Techniques are described for compressing data using machine learning systems and tuning machine learning systems for compressing the data. An example process can include receiving, by a neural network compression system (e.g., trained on a training dataset), input data for compression by the neural network compression system. The process can include determining a set of updates for the neural network compression system, the set of updates including updated model parameters tuned using the input data. The process can include generating, by the neural network compression system using a latent prior, a first bitstream including a compressed version of the input data. The process can further include generating, by the neural network compression system using the latent prior and a model prior, a second bitstream including a compressed version of the updated model parameters. The process can include outputting the first bitstream and the second bitstream for transmission to a receiver.

33 Claims, 16 Drawing Sheets

(58) Field of Classification Search
USPC .......................................... 348/14.01–14.16
See application file for complete search history.

(56) References Cited

OTHER PUBLICATIONS

Habibian A., et al., "Video Compression with Rate-Distortion Autoencoders", arxiv.org, Cornell University Library, 201 Olin Library Cornell University, Ithaca, NY, 14853, Aug. 14, 2019, 14 Pages, 20191113, XP081531236, abstract, Sections 1-4, figures 1-3.
International Search Report and Written Opinion—PCT/US2021/048245—ISA/EPO—Jan. 4, 2022.
Ladune T., et al., "Binary Probability Model for Learning Based Image Compression", ICASSP 2020-2020 IEEE International Conference on Acoustics, Speech and Signal Processing (ICASSP), IEEE, May 4, 2020, pp. 2168-2172, XP033793693, DOI: 10.1109/ICASSP40776.2020.9053997, the whole document.
Minnen D., et al., "Image-Dependent Local Entropy Models for Learned Image Compression", 2018 25th IEEE International Conference on Image Processing (ICIP), IEEE, Oct. 7, 2018, pp. 430-434, XP033455072, DOI: 10.1109/ICIP.2018.8451502 the whole document.

* cited by examiner

1300

```
┌─────────────────────────────────────────────────────────┐
│  RECEIVE A COMPRESSED VERSION OF AN UPDATED NEURAL      │
│  NETWORK COMPRESSION SYSTEM AND A COMPRESSED VERSION    │
│          OF ENCODED IMAGE CONTENT                       │
│                      1302                               │
└─────────────────────────────────────────────────────────┘
                            │
                            ▼
┌─────────────────────────────────────────────────────────┐
│  DECOMPRESS, USING A SHARED PROBABILISTIC MODEL, THE    │
│    COMPRESSED VERSION OF THE NEURAL NETWORK             │
│  COMPRESSION SYSTEM INTO AN UPDATED NEURAL NETWORK      │
│            COMPRESSION SYSTEM MODEL                     │
│                      1304                               │
└─────────────────────────────────────────────────────────┘
                            │
                            ▼
┌─────────────────────────────────────────────────────────┐
│  DECOMPRESS, USING THE UPDATED PROBABILISTIC MODEL AND  │
│   THE UPDATED NEURAL NETWORK COMPRESSION SYSTEM         │
│   MODEL, THE COMPRESSED VERSION OF THE ENCODED IMAGE    │
│          CONTENT INTO LATENT CODE SPACE                 │
│                      1306                               │
└─────────────────────────────────────────────────────────┘
                            │
                            ▼
┌─────────────────────────────────────────────────────────┐
│    GENERATE RECONSTRUCTED IMAGE CONTENT USING THE       │
│  UPDATED NEURAL NETWORK COMPRESSION SYSTEM MODEL AND    │
│  THE DECOMPRESSED CONTENT OF THE LATENT CODE SPACE      │
│                      1308                               │
└─────────────────────────────────────────────────────────┘
                            │
                            ▼
┌─────────────────────────────────────────────────────────┐
│         OUTPUT THE RECONSTRUCTED IMAGE CONTENT          │
│                      1310                               │
└─────────────────────────────────────────────────────────┘
```

FIG. 13

INSTANCE-ADAPTIVE IMAGE AND VIDEO COMPRESSION USING MACHINE LEARNING SYSTEMS

CROSS-REFERENCE TO RELATED APPLICATIONS

This application claims the benefit of priority to U.S. Provisional Application No. 63/083,747, filed on Sep. 25, 2020, and entitled "IMAGE COMPRESSION USING MACHINE LEARNING SYSTEMS", the contents of which are incorporated herein in their entirety and for all purposes.

TECHNICAL FIELD

The present disclosure generally relates to data compression and, more particularly, to using machine learning systems to compress image and/or video content.

BACKGROUND

Many devices and systems allow image/video data to be processed and output for consumption. Digital image/video data includes large amounts of data to meet increasing demands in image/video quality, performance, and features. For example, consumers of video data typically desire high quality videos, with high fidelity, resolutions, frame rates, and the like. The large amounts of video data often needed to meet these demands places a significant burden on communication networks and devices that process and store the video data. Video coding techniques may be used to compress video data. One example goal of video coding is to compress video data into a form that uses a lower bit rate, while avoiding or minimizing degradations in video quality. With ever-evolving video services becoming available and the increasing demands in large amounts of video data, coding techniques with better performance and efficiency are needed.

SUMMARY

In some examples, systems and techniques are described for data compression and/or decompression using one or more machine learning systems. In some examples, machine learning systems are provided for compressing and/or decompressing image/video data. According to at least one illustrative example, a method of compressing and/or decompressing image/video data is provided. In some examples, the method can include receiving, by a neural network compression system, input data for compression by the neural network compression system; determining a set of updates for the neural network compression system, the set of updates comprising updated model parameters tuned using the input data; generating, by the neural network compression system using a latent prior, a first bitstream comprising a compressed version of the input data; generating, by the neural network compression system using the latent prior and a model prior, a second bitstream comprising a compressed version of the updated model parameters; and outputting the first bitstream and the second bitstream for transmission to a receiver.

According to at least one illustrative example, a non-transitory computer-readable medium is provided for compressing and/or decompressing image/video data. In some aspects, the non-transitory computer-readable medium can include instructions that, when executed by one or more processors, cause the one or more processors to receive, by a neural network compression system, input data for compression by the neural network compression system; determine a set of updates for the neural network compression system, the set of updates comprising updated model parameters tuned using the input data; generate, by the neural network compression system using a latent prior, a first bitstream comprising a compressed version of the input data; generate, by the neural network compression system using the latent prior and a model prior, a second bitstream comprising a compressed version of the updated model parameters; and output the first bitstream and the second bitstream for transmission to a receiver.

According to at least one illustrative example, an apparatus is provided for compressing and/or decompressing image/video data. In some aspects, the apparatus can include memory having stored thereon computer-readable instructions and one or more processors configured to receive, by a neural network compression system, input data for compression by the neural network compression system; determine a set of updates for the neural network compression system, the set of updates comprising updated model parameters tuned using the input data; generate, by the neural network compression system using a latent prior, a first bitstream comprising a compressed version of the input data; generate, by the neural network compression system using the latent prior and a model prior, a second bitstream comprising a compressed version of the updated model parameters; and output the first bitstream and the second bitstream for transmission to a receiver.

According to another illustrative example, an apparatus for compressing and/or decompressing image/video data can include means for receiving, by a neural network compression system, input data for compression by the neural network compression system; determining a set of updates for the neural network compression system, the set of updates comprising updated model parameters tuned using the input data; generating, by the neural network compression system using a latent prior, a first bitstream comprising a compressed version of the input data; generating, by the neural network compression system using the latent prior and a model prior, a second bitstream comprising a compressed version of the updated model parameters; and outputting the first bitstream and the second bitstream for transmission to a receiver.

In some aspects, the method, apparatuses, and computer-readable medium described above can generate a concatenated bitstream comprising the first bitstream and the second bitstream, and send the concatenated bitstream to the receiver.

In some examples, the second bitstream comprises a compressed version of the latent prior and a compressed version of the model prior.

In some cases, generating the second bitstream can include entropy encoding, by the neural network compression system, the latent prior using the model prior; and entropy encoding, by the neural network compression system, the updated model parameters using the model prior.

In some examples, the updated model parameters comprise one or more updated parameters of a decoder model. In some cases, the one or more updated parameters can be tuned using the input data.

In some examples, the updated model parameters comprise one or more updated parameters of an encoder model. In some cases, the one or more updated parameters can be tuned using the input data. In some cases, the first bitstream is generated by the neural network compression system using the one or more updated parameters.

In some examples, generating the second bitstream can include encoding, by the neural network compression system using the one or more updated parameters, the input data into a latent space representation of the input data; and entropy encoding, by the neural network compression system using the latent prior, the latent space representation into the first bitstream.

In some aspects, the method, apparatuses, and computer-readable medium described above can generate model parameters of the neural network compression system based on a training dataset used to train the neural network compression system; tune the model parameters of the neural network compression system using the input data; and determine the set of updates based on a difference between the model parameters and the tuned model parameters.

In some examples, the model parameters are tuned based on the input data, a bit size of the compressed version of the input data, a bit size of the set of updates, and a distortion between the input data and reconstructed data generated from the compressed version of the input data.

In some examples, the model parameters are tuned based on the input data and a ratio of a cost of sending the set of updates and a distortion between the input data and reconstructed data generated from the compressed version of the input data, the cost being based on a bit size of the set of updates.

In some examples, tuning the model parameters can include including one or more parameters in the tuned model parameters based on a determination that including the one or more parameters in the tuned model parameters is accompanied by a decrease in at least one of a bit size of the compressed version of the input data and a distortion between the input data and reconstructed data generated from the compressed version of the input data.

In some examples, determining the set of updates for the neural network compression system can include processing the input data at the neural network compression system; determining one or more losses for the neural network compression system based on the processed input data; and tuning model parameters of the neural network compression system based on the one or more losses, the tuned model parameters comprising the set of updates for the neural network compression system.

In some cases, the one or more losses comprise a rate loss associated with a rate for sending the compressed version of the input data based on a size of the first bitstream, a distortion loss associated with a distortion between the input data and reconstructed data generated from the compressed version of the input data, and model rate loss associated with a rate for sending the compressed version of the updated model parameters based on a size of the second bitstream.

In some examples, the receiver comprises an encoder. In some aspects, the method, apparatuses, and computer-readable medium described above can receive, by the encoder, data comprising the first bitstream and the second bitstream; decode, by the decoder, the compressed version of the updated model parameters based on the second bitstream; and generate, by the decoder using the set of updated parameters, a reconstructed version of the input data based on the compressed version of the input data in the first bitstream.

In some aspects, the method, apparatuses, and computer-readable medium described above can train the neural network compression system by reducing a rate-distortion and model-rate loss, wherein a model-rate reflects a length of a bitstream for sending model updates.

In some examples, the model prior comprises an independent Gaussian network prior, an independent Laplace network prior, and/or an independent Spike and Slab network prior.

In some aspects, an apparatus can be, or can be part of, a camera (e.g., an IP camera), a mobile device (e.g., a mobile telephone or so-called "smartphone," or other mobile device), a smart wearable device, an extended reality device (e.g., a virtual reality (VR) device, an augmented reality (AR) device, or a mixed reality (MR) device), a personal computer, a laptop computer, a server computer, a 3D scanner, a multi-camera system, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 13 is a flowchart illustrating an example of a process for decompressing one or more images, in accordance with some examples of the present disclosure.

DETAILED DESCRIPTION

Figure 1:
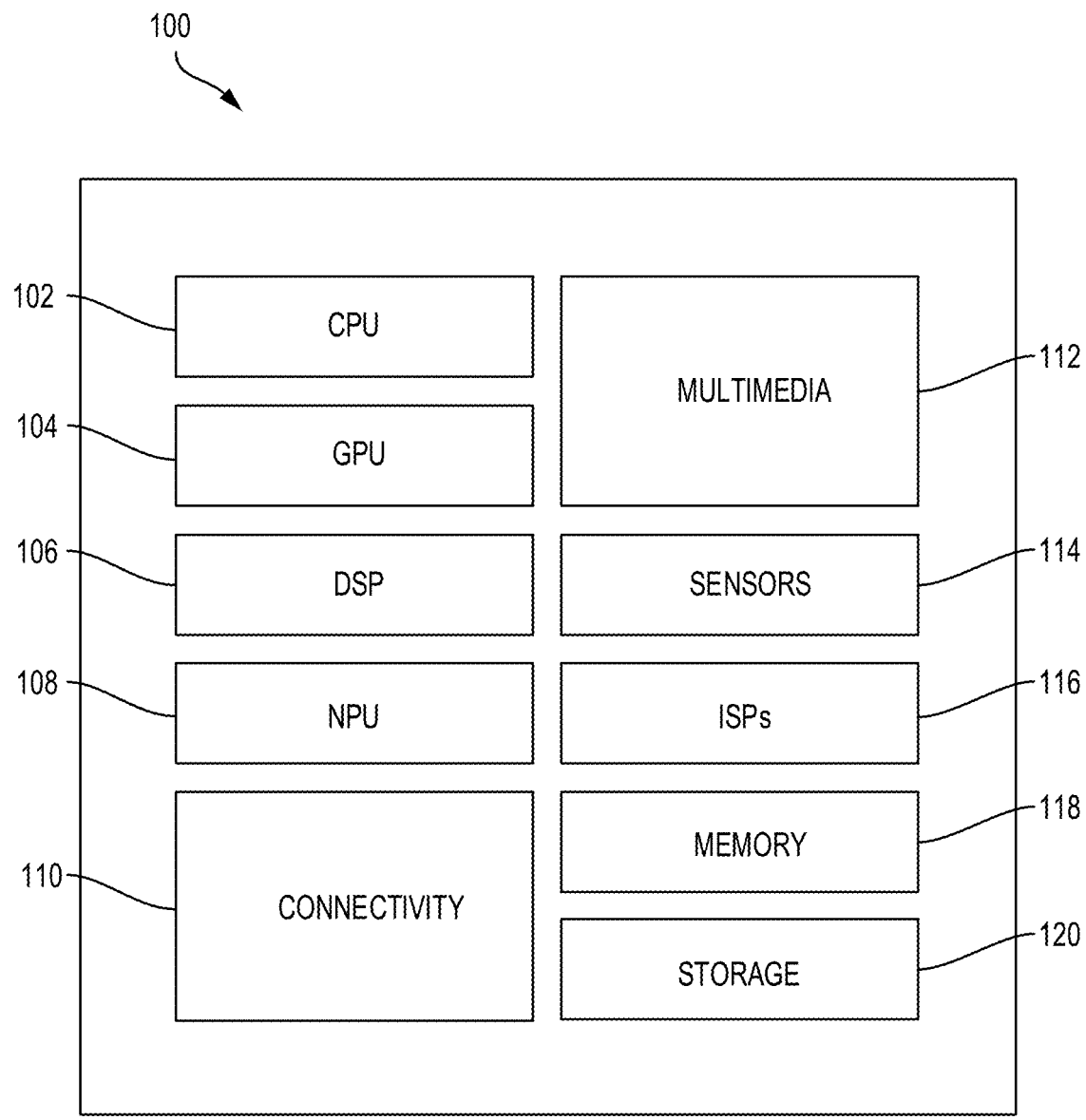
FIG. 1 is a diagram illustrating an example of an image processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

As noted above, digital image and video data can include large amounts of data, particularly as the demand for high quality video data continues to grow. For example, consumers of image and video data typically desire increasingly high video quality, such as high fidelity, resolution, frame rates, and the like. However, the large amount of data needed to meet such demands can place a significant burden on communication networks, such as high bandwidth and network resource requirements, and on devices that process and store the video data. Compression algorithms (also referred to as coding algorithms or tools) for reducing the amount of data that is needed for storage and/or transmission of image and video data are thus advantageous.

Various techniques can be used to compress image data and video data. Compression of image data has been accomplished using algorithms such as Joint Photographic Experts Group (JPEG), Better Portable Graphics (BPG), among others. In recent years, neural network based compression methods have shown significant promise in compressing image data. Video coding can be performed according to a particular video coding standard. Example video coding standards include high-efficiency video coding (HEVC), essential video coding (EVC), advanced video coding (AVC), moving picture experts group (MPEG) coding, and versatile video coding (VVC). However, such conventional image and video coding techniques can result in artifacts in a reconstructed image after decoding is performed.

In some aspects, systems, apparatuses, processes (also referred to as methods), and computer-readable media (collectively referred to herein as "systems and techniques") are described herein for performing data (e.g., image, video, audio, etc.) compression and decompression (also referred to as encoding and decoding, collectively referred to as coding) using one or more machine learning systems. The one or more machine learning systems can be trained as described herein and used to perform data compression and/or decompression, such as image, video, and/or audio compression and decompression. The machine learning systems described herein can perform training and compression/decompression techniques that produce high quality data outputs.

The systems and techniques described herein can perform compression and/or decompression of any type of data. For example, in some cases, the systems and techniques described herein can perform compression and/or decompression of image data. As another example, in some cases, the systems and techniques described herein can perform compression and/or decompression of video data. As another example, in some cases, the systems and techniques described herein can perform compression and/or decompression of audio data. For simplicity, illustration and explanation purposes, the systems and techniques described herein are discussed with reference to compression and/or decompression of image data (e.g., images, videos, etc.). However, as noted above, the concepts described herein can also apply to other modalities such as audio data and any other type of data.

In some examples, a machine learning system for data compression and/or decompression can be trained on a set of training data (e.g., images, video, audio, etc.) and can be further fine-tuned (e.g., trained, fitted) for the data that is to be transmitted to and decoded by a receiver. In some cases, an encoder of a machine learning system can send to a decoder updated parameters of a compression model that is fine-tuned using the data that is to be sent to and decoded by the decoder. In some examples, the encoder can send the updated model parameters without other model parameters (and/or instead of sending the full set of model parameters) in order to reduce the amount and/or bitrate of the data sent to the decoder. In some cases, the updated model parameters can be quantized and compressed using a model prior to reduce the amount and/or bitrate of the data sent to the decoder.

A compression model used by the encoder and/or decoder can be generalizable to different types of data. Moreover, by fine-tuning the compression model to the data being sent and decoded, the machine learning system can increase the compression and/or decompression performance, quality, and/or efficiency for that particular data. In some cases, a model of a machine learning system can be trained with rate and distortion losses and an additional rate loss that reflects and/or accounts for the extra overhead and bitrates when sending the updated model parameters. The model can be trained to minimize the rate (e.g., the size/length of the bitstream), distortion (e.g., distortion between input and reconstructed output), and the model-rate loss (e.g., the loss reflecting the cost of sending the updated model parameters). In some examples, the machine learning system can trade off rate, distortion and model rate (e.g., the size/length of the bitstream needed to send updated model parameters).

In some examples, the machine learning system can include one or more neural networks. Machine learning (ML) is a subset of artificial intelligence (AI). ML systems include algorithms and statistical models that computer systems can use to perform various tasks by relying on patterns and inference, without the use of explicit instructions. One example of a ML system is a neural network (also referred to as an artificial neural network), which may be composed of an interconnected group of artificial neurons (e.g., neuron models). Neural networks may be used for various applications and/or devices, such as image analysis and/or computer vision applications, Internet Protocol (IP) cameras, Internet of Things (IoT) devices, autonomous vehicles, service robots, among others.

Individual nodes in the neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network (e.g., weight values are established during a training phase in which the network learns how to identify particular classes by their typical input data characteristics).

Different types of neural networks exist, such as deep generative neural network models (e.g., generative adversarial network (GANs)), recurrent neural network (RNN) models, multilayer perceptron (MLP) neural network models, convolutional neural network (CNN) models, autoencoders (AEs), among others. For example, a GAN is a form of generative neural network that can learn patterns in input data so that the neural network model can generate new synthetic outputs that reasonably could have been from the original dataset. A GAN can include two neural networks that operate together. One of the neural networks (referred to as a generative neural network or generator denoted as G(z)) generates a synthesized output, and the other neural network (referred to as an discriminative neural network or discriminator denoted as D(X)) evaluates the output for authenticity (whether the output is from an original dataset, such as the training dataset, or is generated by the generator). The training input and output can include images as an illustrative example. The generator is trained to try and fool the discriminator into determining a synthesized image generated by the generator is a real image from the dataset. The training process continues and the generator becomes better at generating the synthetic images that look like real images. The discriminator continues to find flaws in the synthesized images, and the generator figures out what the discriminator is looking at to determine the flaws in the images. Once the network is trained, the generator is able to produce realistic looking images that the discriminator is unable to distinguish from the real images.

RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. CNNs may include collections of artificial neurons that each have a receptive field (e.g., a spatially localized region of an input space) and that collectively tile an input space. CNNs have numerous applications, including pattern recognition and classification.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

An autoencoder (AE) can learn efficient data codings in an unsupervised manner. In some examples, an AE can learn a representation (e.g., data coding) for a set of data by training the network to ignore signal noise. An AE can include an encoder and a decoder. The encoder can map input data into code and the decoder can map the code to a reconstruction of the input data. In some examples, a rate-distortion autoencoder (RD-AE) can be trained to minimize the average rate-distortion loss over a dataset of datapoints such as image and/or video datapoints. In some cases, the RD-AE can do a forward pass at inference time to encode a new datapoint.

In some cases, an RD-AE can be fine-tuned on data to be transmitted to a receiver, such as a decoder. In some examples, by fine-tuning the RD-AE on a datapoint, the RD-AE can obtain high compression (e.g., Rate/Distortion) performance. An encoder associated with the RD-AE can send the RD-AE model or part of the RD-AE model to a receiver (e.g., a decoder) for the receiver to decode a bitstream including compressed data transmitted by the encoder.

In some cases, AE models can be large, which can increase a bitrate and/or reduce rate-distortion gains. In some examples, an RD-AE model can be fine-tuned using a model prior (e.g., an RDM-AE prior). The model prior can be defined and used to generate model updates for a receiver (e.g., a decoder) to use to implement the model to decompress transmitted data. The model prior can reduce the amount of data transmitted to the decoder through the model updates generated under the model prior. In some examples, the model prior can be designed to reduce a cost for transmitting model updates. For example, the model prior can be used to reduce and/or limit the bitrate overhead of the model updates and/or produce smaller model updates. In some cases, as more parameters are fine-tuned, the bitrate overhead of the model updates can increase. In some examples, the parameters that are fine-tuned can be reduced, which can also reduce or limit the bitrate overhead.

In some cases, the model can be fine-tuned using RDM-AE losses. A loss term can be added to the bitrate for the model-rate. The loss term added can compensate bits "spent" on model updates. For example, during fine-tuning, any bit "spent" on model updates can be compensated by an improvement of rate-distortion (R/D). In some examples, during fine-tuning, any bit "spent" on model updates can be compensated by an improvement of at least as much rate-distortion.

In some cases, a design of the model prior can be improved as further described herein. In some illustrative examples, the model prior design can include an independent Gaussian model prior. In other illustrative examples, the model prior design can include an independent Laplace model prior. In other illustrative examples, the model prior design can include an independent Spike and Slab prior. In some illustrative examples, the model prior and a global AE model can be trained jointly. In some illustrative examples, the model prior can include complex dependencies that are learned by a neural network.

FIG. 1 is a diagram illustrating an example of an image processing system 100 in accordance with some examples of the present disclosure. In some cases, the image processing system 100 can include a central processing unit (CPU) 102 or a multi-core CPU configured to perform one or more of the functions described herein. Variables (e.g., neural signals and synaptic weights), system parameters associated with a computational device (e.g., a neural network with weights), delays, frequency bin information, task information, among other information, may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or distributed across multiple blocks. Instructions executed at the CPU 102 may be loaded from a program memory associated with the CPU 102 and/or a memory block 118.

The image processing system 100 may include additional processing blocks tailored to specific functions, such as a GPU 104; a DSP 106; a connectivity block 110 which may include fifth generation (5G) connectivity, fourth generation long term evolution (4G LTE) connectivity, Wi-Fi connectivity, USB connectivity, Bluetooth connectivity, and the like; and/or a multimedia processor 112 that may, for example, detect and recognize features. In one implementation, the NPU 108 is implemented in the CPU 102, DSP 106, and/or GPU 104. The image processing system 100 may also include a sensor processor 114, one or more image signal processors (ISPs) 116, and/or a storage 120. In some examples, the image processing system 100 may be based on an ARM instruction set.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a digital media player, a gaming console, a video streaming device, a drone, a computer in a car, a system-on-chip (SOC), an Internet-of-Things (IoT) device, or any other suitable electronic device(s).

While the image processing system 100 is shown to include certain components, one of ordinary skill will appreciate that the image processing system 100 can include more or fewer components than those shown in FIG. 1. For example, the image processing system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to FIG. 14.

The image processing system 100 and/or components thereof can be configured to perform compression and/or decompression (also referred to as encoding and/or decoding, collectively referred to as image coding) using the machine learning systems and techniques described herein. In some cases, the image processing system 100 and/or components thereof can be configured to perform image or video compression and/or decompression using the techniques described herein. In some examples, the machine learning systems can utilize deep learning neural network architectures to perform compression and/or decompression of image, video, and/or audio data. By using deep learning neural network architectures, the machine learning systems can increase the efficiency and speed of the compression and/or decompression of content on a device. For example, a device using the compression and/or decompression techniques described can compress one or more images efficiently using the machine learning based techniques, can transmit the compressed one or more images to a receiving device, and the receiving device can decompress the one or more compressed images efficiently using the machine learning based techniques described herein. As used herein, an image can refer to a still image and/or a video frame associated with a sequence of frames (e.g., a video).

As noted above, a neural network is an example of a machine learning system. A neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data.

For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
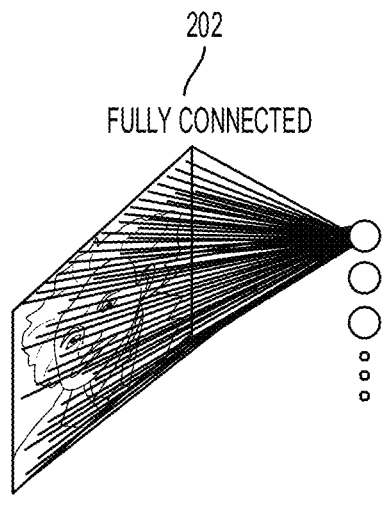
FIG. 2A is a diagram illustrating an example of a fully-connected neural network, in accordance with some examples of the present disclosure.
Figure 2B:
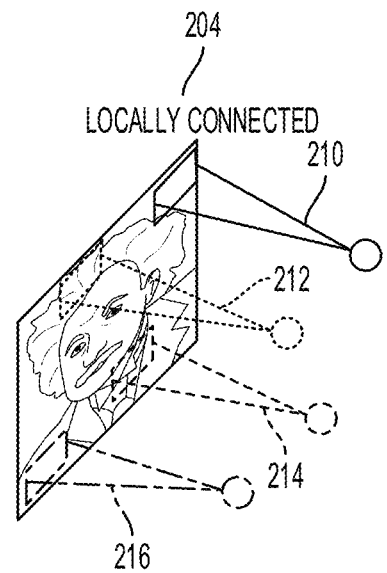
FIG. 2B is a diagram illustrating an example of a locally-connected neural network, in accordance with some examples of the present disclosure.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
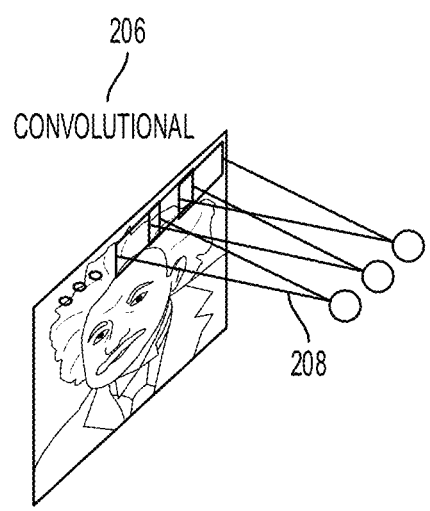
FIG. 2C is a diagram illustrating an example of a convolutional neural network, in accordance with some examples of the present disclosure.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
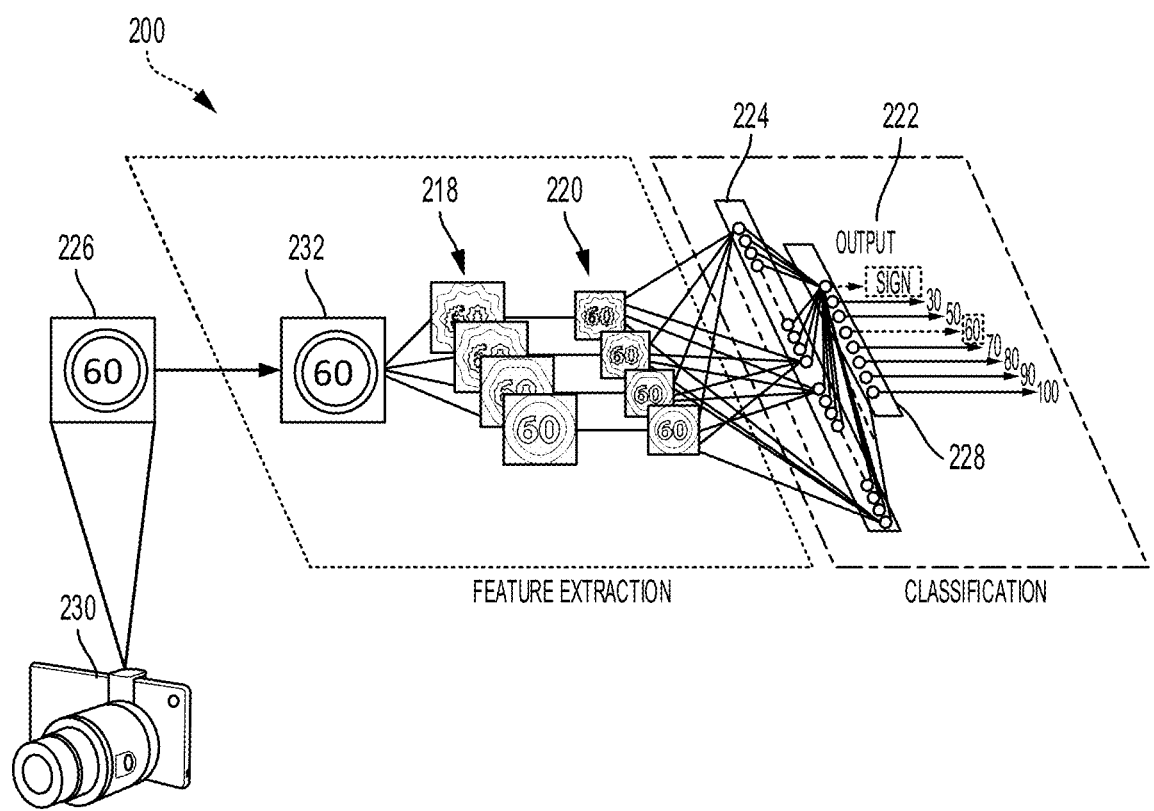
FIG. 2D is a diagram illustrating an example of a deep convolutional network (DCN) for recognizing visual features from an image, in accordance with some examples of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
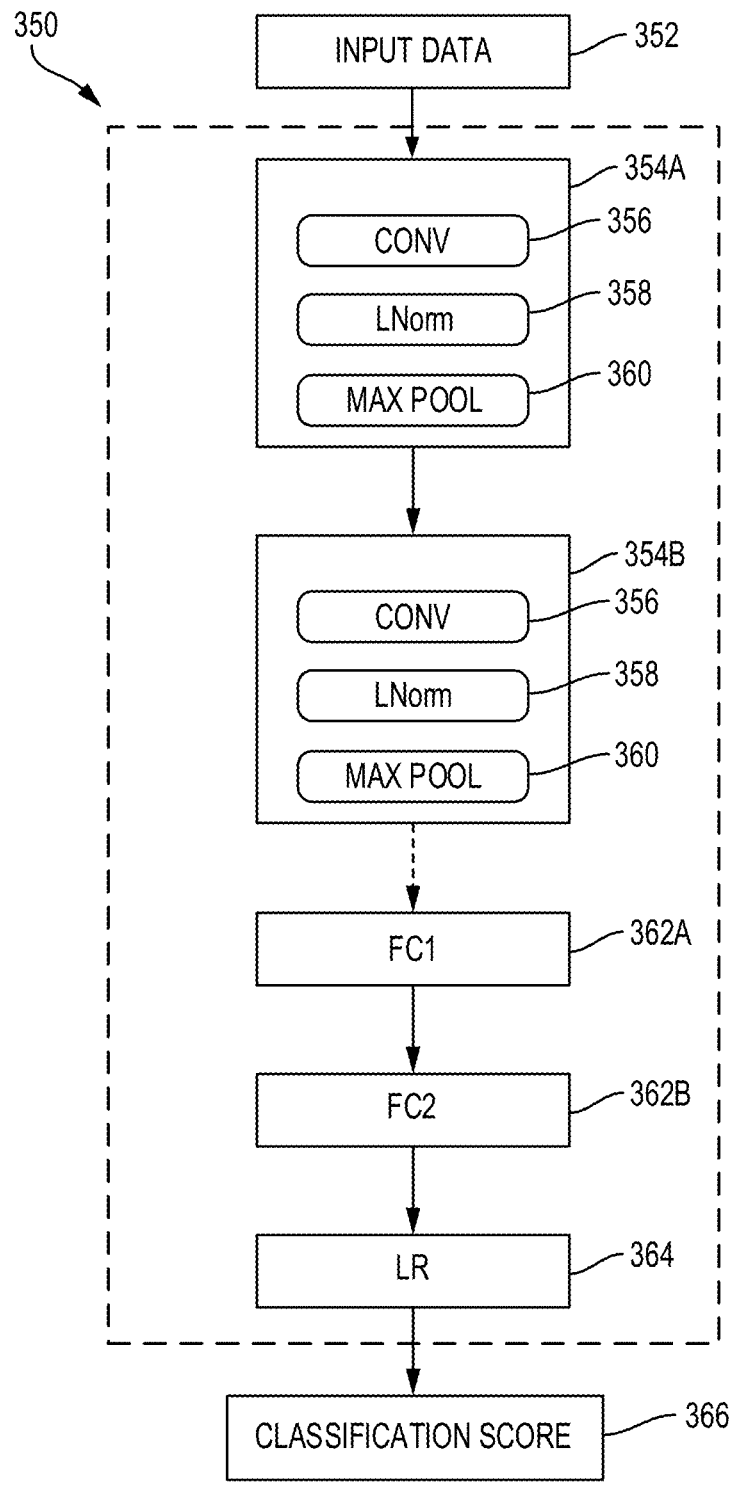
FIG. 3 is a block diagram illustrating an example deep convolutional network (DCN), in accordance with some examples of the present disclosure.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an image processing system 100 to achieve high performance and low power consumption. In alternative embodiments, the parallel filter banks may be loaded on the DSP 106 or an ISP 116 of an image processing system 100. In addition, the deep convolutional network 350 may access other processing blocks that may be present on the image processing system 100, such as sensor processor 114.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Image and video content may be stored and/or may be shared among devices. For instance, image and video content can be uploaded to media hosting services and sharing platforms, and can be transmitted to a variety of devices. Recording uncompressed image and video content generally results in large file sizes that greatly increase as the resolution of the image and video content increases. For example, uncompressed 16-bit per channel video recorded in 1080p/24 (e.g., a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Because uncompressed image and video content can result in large files that may involve sizable memory for physical storage and considerable bandwidth for transmission, techniques may be utilized to compress such video content. For instance, to reduce the size of image content—and thus the amount of storage involved to store image content and the amount of bandwidth involved in delivering video content—various compression algorithms may be applied to image and video content.

In some cases, image content can be compressed using a priori defined compression algorithms, such as Joint Photographic Experts Group (JPEG), Better Portable Graphics (BPG), among others. JPEG, for example, is a lossy form of compression that is based on the discrete cosine transform (DCT). For instance, a device performing JPEG compression of an image can transform the image into an optimal color space (e.g., a YCbCr color space, including luminance (Y), chrominance-blue (Cb), chrominance-red (Cr)), can downsample the chrominance components by averaging groups of pixels together, and can apply a DCT function to blocks of pixels to remove redundant image data and thus compress the image data. The compression is based on identification of similar regions inside of the image and converting the regions to a same color code (based on the DCT function). Video content can also be compressed using a priori defined compression algorithms, such as the Motion Picture Experts Group (MPEG) algorithms, H.264, or the High Efficiency Video Coding algorithm.

These a priori defined compression algorithms may be able to retain the majority of the information in raw image and video content, and may be defined a priori based on signal processing and information theory ideas. However, while these predefined compression algorithms may be applicable generally (e.g., to any type of image/video content), the compression algorithms may not take into account similarities in content, new resolutions or frame rates for video capture and delivery, non-natural imagery (e.g., radar imagery or other imagery captured via various sensors), and the like.

The a priori defined compression algorithms are considered lossy compression algorithms. In lossy compression of an input image (or video frame), the input image cannot be coded and then decoded/reconstructed so that the exact input image is reconstructed. Rather, in lossy compression, an approximate version of the input image is generated after decoding/reconstruction of the compressed input image. Lossy compression results in a reduction in bitrate, at the cost of distortion which results in artifacts being present in the reconstructed image. Therefore, there is a rate-distortion trade-off in lossy compression systems. For certain compression methods (e.g., JPEG, BPG, among others), the distortion-based artifacts can take the form of blocking or other artifacts. In some cases, neural network based compression can be used and can result in high quality compression of image data and video data. In some cases, blurring and color shift are examples of artifacts.

Whenever the bitrate goes below a true entropy of input data, it may be difficult or impossible to reconstruct the exact input data. However, the fact that there is distortion/loss realized from the compression/decompression of the data does not mean that the reconstructed image or frame does not have to have artifacts. Indeed, it can be possible to reconstruct a compressed image to another similar, but different, image that has high visual quality.

As previously noted, the systems and techniques described herein can perform compression and decompression using one or more machine learning (ML) systems. In some examples, the machine learning techniques can provide image and/or video compression that produces high quality visual outputs. In some examples, the systems and techniques described herein can perform compression and decompression of content (e.g., image content, video content, audio content, etc.) using a deep neural network(s) such as a rate-distortion autoencoder (RD-AE). The deep neural network can include an autoencoder (AE) that maps images into a latent code space (e.g., including a set of codes z). The latent code space can include a code space used by an encoder and a decoder, and in which the content has been encoded into the codes z. The codes (e.g., codes z) can also be referred to as latents, latent variables or latent representations. The deep neural network can include a probabilistic model (also referred to as a prior or code model) that can losslessly compress the codes z from the latent code space. The probabilistic model can generate a probability distribution over the set of codes z that can represent encoded data based on the input data. In some cases, the probability distribution can be denoted as (P(z)).

In some examples, the deep neural network may include an arithmetic coder that generates a bitstream including the compressed data to be output based on the probability distribution P(z) and/or the set of codes z. The bitstream including the compressed data can be stored and/or can be transmitted to a receiving device. The receiving device can perform an inverse process to decode or decompress the bitstream using, for example, an arithmetic decoder, a probabilistic (or code) model, and a decoder of an AE. The device that generated the bitstream including the compressed data can also perform a similar decoding/decompression process when retrieving the compressed data from storage. A similar technique can be performed to compress/encode and decompress/decode updated model parameters.

In some examples, an RD-AE can be trained and operated to perform as a multi-rate AE (including high-rate and low-rate operations). For example, the latent code space generated by an encoder of the multi-rate AE can be divided into two or more chunks (e.g., codes z divided into chunks $z_1$ and $z_2$). In a high-rate operation, the multi-rate AE can send a bitstream that is based on the entire latent space (e.g., codes z, including $z_1$, $z_2$, etc.) which can be used by the receiving device to decompress the data, similar to the operations described above with respect to the RD-AE. In the low-rate operation, the bitstream that is sent to the receiving device is based on a subset of the latent space (e.g., the chunk $z_1$ and not $z_2$). The receiving device can infer the remaining portion of the latent space based on the subset that was sent, and can generate a reconstructed data using the subset of the latent space and the inferred remaining portion of the latent space.

By compressing (and decompressing) content using the RD-AE or the multi-rate AE, encoding and decoding mechanisms can be adaptable to various use cases. The machine learning based compression techniques can generate compressed content having a high quality and/or reduced bitrate. In some examples, an RD-AE can be trained to minimize the average rate-distortion loss over a dataset of datapoints, such as image and/or video datapoints. In some cases, the RD-AE can also be fine-tuned for a particular datapoint to be sent to and decoded by a receiver. In some examples, by fine-tuning the RD-AE on a datapoint, the RD-AE can obtain a high compression (Rate/Distortion) performance. An encoder associated with the RD-AE can send the AE model or part of the AE model to a receiver (e.g., a decoder) to decode the bitstream.

In some cases, a neural network compression system can reconstruct an input instance (e.g., an input image, video, audio, etc.) from a (quantized) latent representation. The neural network compression system can also use a prior to losslessly compress the latent representation. In some cases, the neural network compression system can determine a test-time data distribution is known and relatively low entropy (e.g. a camera watching a static scene, a dash cam in an autonomous car, etc.), and can be fine-tuned or adapted to such distribution. The fine-tuning or adaptation can lead to improved rate/distortion (RD) performance. In some examples, a model of the neural network compression system can be adapted to a single input instance to be compressed. The neural network compression system can provide model updates, which in some examples can be quantized and compressed using a parameter-space prior, along with the latent representation.

The fine-tuning can take into account the effect of model quantization and the additional costs incurred by sending model updates. In some examples, the neural network compression system can be fine-tuned using an RD loss as well as an additional model rate term M that measures the number of bits needed to send model updates under a model prior, resulting in a combined RDM loss.

Figure 4:
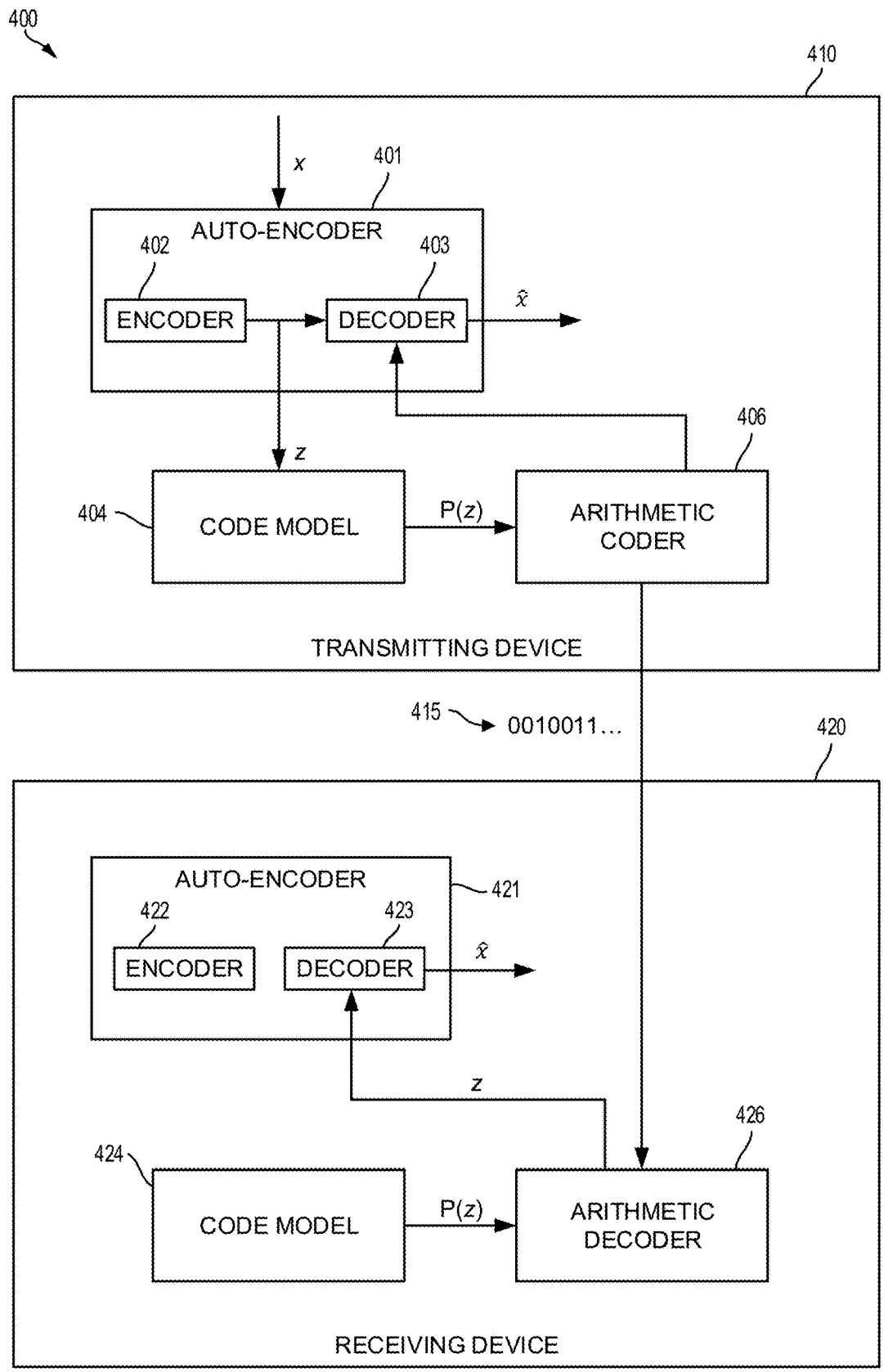
FIG. 4 is a diagram illustrating an example of a system including a transmitting device for compressing video content and a receiving device for decompressing a received bitstream into video content, in accordance with some examples of the present disclosure.

FIG. 4 is a diagram illustrating a system 400 including a transmitting device 410 and a receiving device 420, in accordance with some examples of the present disclosure. The transmitting device 410 and the receiving device 420 can each be referred to in some cases as a RD-AE. The transmitting device 410 can compress image content, and can store the compressed image content and/or transmit the compressed image content to a receiving device 420 for decompression. The receiving device 420 can decompress the compressed image content, and can output the decompressed image content on the receiving device 420 (e.g., for display, editing, etc.) and/or can output the decompressed image content to other devices (e.g., a television, a mobile device, or other device) connected to receiving device 420. In some cases, the receiving device 420 can become a transmitting device by compressing (using encoder 422) image content and storing and/or transmitting the compressed image content to another device, such as the transmitting device 410 (in which case the transmitting device 410 would become a receiving device). While the system 400 is described herein with respect to image compression and decompression, one of skill will appreciate that the system 400 can use the techniques described herein for compressing and decompressing video content.

As illustrated in FIG. 4, the transmitting device 410 includes an image compression pipeline, and the receiving device 420 includes an image bitstream decompression pipeline. The image compression pipeline in the transmitting device 410 and the bitstream decompression pipeline in the receiving device 420 generally use one or more artificial neural networks to compress image content and/or decompress a received bitstream into image content, according to aspects of the present disclosure. The image compression pipeline in the transmitting device 410 includes an autoencoder 401, a code model 404, and an arithmetic coder 406. In some implementations, the arithmetic coder 406 is optional and can be omitted in some cases. The image decompression pipeline in the receiving device 420 includes an autoencoder 421, a code model 424, and an arithmetic decoder 426. In some implementations, the arithmetic decoder 426 is optional and can be omitted in some cases. The autoencoder 401 and the code model 404 of the transmitting device 410 are illustrated in FIG. 4 as a machine learning system that has been previously trained and thus configured for performing operations during inference or operation of the trained machine learning system. The autoencoder 421, the code model 424, and the completion model 425 are also illustrated as a machine learning system that has been previously trained.

The autoencoder 401 includes an encoder 402 and a decoder 403. The encoder 402 can perform lossy compression on received uncompressed image content by mapping pixels in one or more images of the uncompressed image content to a latent code space (including codes z). Generally, encoder 402 may be configured such that the codes z representing a compressed (or encoded) image are discrete or binary. These codes may be generated based on stochastic perturbation techniques, soft vector quantization, or other techniques that can generate distinct codes. In some aspects, autoencoder 401 may map uncompressed images to codes having a compressible (low entropy) distribution. These codes may be close in cross-entropy to a predefined or learned prior distribution.

In some examples, the autoencoder 401 can be implemented using a convolutional architecture. For instance, in some cases, autoencoder 401 can be configured as a two-dimensional convolutional neural network (CNN) such that autoencoder 401 learns spatial filters for mapping image content to the latent code space. In examples in which the system 400 is used for coding video data, the autoencoder 401 can be configured as a three-dimensional CNN such that autoencoder 401 learns spatio-temporal filters for mapping video to a latent code space. In such a network, the autoencoder 401 may encode video in terms of a key frame (e.g., an initial frame marking the beginning of a sequence of frames in which subsequent frames in the sequence are described as a difference relative to the initial frame in the sequence), warping (or differences) between the key frame and other frames in the video, and a residual factor. In other aspects, autoencoder 401 may be implemented as a two-dimensional neural network conditioned on previous frames, a residual factor between frames, and conditioning through stacking channels or including recurrent layers.

The encoder 402 of the autoencoder 401 can receive as input a first image (designated in FIG. 4 as image x) and can map the first image x to a code z in a latent code space. As noted above, the encoder 402 can be implemented as a two-dimensional convolutional network such that the latent code space has at each (x, y) position a vector describing a block of the image x centered at that position. The x-coordinate can represent a horizontal pixel location in the block of the image x, and the y-coordinate can represent a vertical pixel location in the block of the image x. When coding video data, the latent code space can have a t variable or position, with the t variable representing a timestamp in a block of video data (in addition to the spatial x- and y-coordinates). By using the two dimensions of the horizontal and vertical pixel positions, the vector can describe an image patch in the image x.

A decoder 403 of the autoencoder 401 can then decompress the code z to obtain a reconstruction $\hat{x}$ of the first image x. Generally, the reconstruction $\hat{x}$ can be an approximation of the uncompressed first image x and need not be an exact copy of the first image x. In some cases, the reconstructed image $\hat{x}$ can be output as a compressed image file for storage in the transmitting device.

The code model 404 receives the code z representing an encoded image or portion thereof and generates a probability distribution P(z) over a set of compressed codewords that can be used to represent the code z. In some examples, the code model 404 can include a probabilistic auto-regressive generative model. In some cases, the codes for which a probability distribution may be generated include a learned distribution that controls bit assignment based on the arithmetic coder 406. For example, using the arithmetic coder 406, a compression code for a first code z can be predicted in isolation; a compression code for a second code z can be predicted based on the compression code for the first code z; a compression code for a third code z can be predicted based on the compression codes for the first code z and the second code z, and so on. The compression codes generally represent different spatio-temporal chunks of a given image to be compressed.

In some aspects, z may be represented as a three-dimensional tensor. The three dimensions of the tensor may include a feature channel dimension, and height and width spatial dimensions (e.g., denoted as code $z_{c,w,h}$). Each code $z_{c,w,h}$ (representing a code indexed by channel and horizontal and vertical position) can be predicted based on a previous code, which can be a fixed and theoretically arbitrary ordering of codes. In some examples, the codes can be generated by analyzing a given image file from start to finish and analyzing each block in the image in a raster scan order.

The code model 404 can learn the probability distribution for an input code z using a probabilistic auto-regressive model. The probability distribution can be conditioned on its previous values (as described above). In some examples, the probability distribution can be represented by the following equation:

$$P(z) = \Pi_{c=0}^{C} \Pi_{w=0}^{W} \Pi_{h=0}^{H} p(z_{c,w,h} | z_{0:c,0:w,0:h}) \quad \text{Equation (1),}$$

where c is a channel index for all image channels C (e.g., the R, G, and B channels, the Y, Cb, and Cr channels, or other channels), w is a width index for a total image frame width W, and h is a height index for a total image frame height H.

In some examples, the probability distribution P(z) can be predicted by a fully convolutional neural network of causal convolutions. In some aspects, the kernels of each layer of the convolutional neural network can be masked such that the convolutional network is aware of previous values $z_{0:c,0:w,0:h}$ and may not be aware of other values in calculating a probability distribution. In some aspects, a final layer of the convolutional network may include a softmax function that determines the probability of a code in latent space being applicable over an input value (e.g., a likelihood that a given code can be used to compress a given input).

The arithmetic coder 406 uses the probability distribution P(z) generated by the code model 404 to generate a bitstream 415 (shown in FIG. 4 as "0010011 . . . ") corresponding to a prediction of the code z. The prediction of the code z can be represented as the code having a highest probability score in a probability distribution P(z) generated over a set of possible codes. In some aspects, the arithmetic coder 406 can output a bitstream of variable length based on the accuracy of a prediction of code z and the actual code z generated by the autoencoder 401. For example, the bitstream 415 can correspond to a short codeword if the prediction is accurate, whereas the bitstream 415 may correspond to longer codewords as a magnitude of a difference between code z and the prediction of code z increases.

In some cases, the bitstream 415 can be output by arithmetic coder 406 for storage in a compressed image file. The bitstream 415 can also be output for transmission to a requesting device (e.g., the receiving device 420, as illustrated in FIG. 4). Generally, the bitstream 415 output by the arithmetic coder 406 may losslessly encode z such that z may be accurately recovered during a decompression processes applied on a compressed image file.

The bitstream 415 generated by the arithmetic coder 406 and transmitted from the transmitting device 410 can be received by the receiving device 420. Transmission between the transmitting device 410 and the receiving device 420 can occur using any of various suitable wired or wireless communication technologies. Communication between the transmitting device 410 and the receiving device 420 may be direct or may be performed through one or more network infrastructure components (e.g., base stations, relay stations, mobile stations, network hubs, routers, and/or other network infrastructure components).

As illustrated, the receiving device 420 can include an arithmetic decoder 426, a code model 424, and an autoencoder 421. The autoencoder 421 includes an encoder 422 and a decoder 423. The decoder 423, for a given input, can produce the same or a similar output as the decoder 403. While the autoencoder 421 is illustrated as including the encoder 422, the encoder 422 need not be used during the decoding process to obtain (e.g., an approximation of an original image x that was compressed at the transmitting device 410) from a code z received from the transmitting device 410.

The received bitstream 415 can be input into the arithmetic decoder 426 to obtain one or more codes z from the bitstream. The arithmetic decoder 426 may extract a decompressed code z based on a probability distribution P(z) generated by the code model 424 over a set of possible codes and information associating each generated code z with a bitstream. Given a received portion of the bitstream and a probabilistic prediction of the next code z, the arithmetic decoder 426 can produce a new code z as it was encoded by arithmetic coder 406 at transmitting device 410. Using the new code z, the arithmetic decoder 426 can make a probabilistic prediction for a successive code z, read an additional part of the bitstream, and decode the successive code z until the entire received bitstream is decoded. The decompressed code z may be provided to the decoder 423 in the autoencoder 421. The decoder 423 decompresses the code z and outputs an approximation z (which can be referred to as a reconstructed or decoded image) of the image content x. In some cases, the approximation z of the content x can be stored for later retrieval. In some cases, the approximation z of the content x may be recovered by the receiving device 420 and displayed on a screen communicatively coupled to or integral with the receiving device 420.

As noted above, the autoencoder 401 and the code model 404 of the transmitting device 410 are illustrated in FIG. 4 as a machine learning system that has been previously trained. In some aspects, autoencoder 401 and the code model 404 can be trained together using image data. For instance, the encoder 402 of the autoencoder 401 can receive as input a first training image n and can map the first training image n to a code z in the latent code space. The code model 404 can learn a probability distribution P(z) for the code z using the probabilistic auto-regressive model (similar to the techniques described above). The arithmetic coder 406 can use the probability distribution P(z) generated by the code model 404 to generate an image bitstream. Using the bitstream and the probability distribution P(z) from the code model 404, the arithmetic coder 406 can generate the code z, and can output the code z to the decoder 403 of the autoencoder 401. The decoder 403 can then decompress the code z to obtain a reconstruction n̂ of the first training image n (where the reconstruction n̂ is an approximation of the uncompressed first training image n).

In some cases, a backpropagation engine used during training of the transmitting device 410 can perform a backpropagation process to tune parameters (e.g., weights, biases, etc.) of the neural network of the autoencoder 401 and the code model 404 based on one or more loss functions. In some cases, the backpropagation process can be based on stochastic gradient descent techniques. Backpropagation can include a forward pass, one or more loss functions, a backward pass, and a weight (and/or other parameter(s)) update. The forward pass, loss function, backward pass, and parameter update can be performed for one training iteration. The process can be repeated for a certain number of iterations for each set of training data until the weights and/or other parameters of the neural network are accurately tuned.

For example, the autoencoder 401 can compare n and n̂ to determine a loss (e.g., represented by a distance vector or other difference value) between the first training image n and the reconstructed first training image n. The loss function can be used to analyze error in the output. In some examples, the loss can be based on a maximum likelihood. In one illustrative example using an uncompressed image n as input and reconstructed image n̂ as the output, the loss function Loss=D+beta*R can be used to train the neural network system of the autoencoder 401 and code model 404, where R is rate, D is distortion, * denotes a multiplication function, and beta is a tradeoff parameter that is set to a value that defines the bitrate. In another example, the loss function Loss0=$\Sigma_t$ distortion(n,n̂) can be used to train the neural network system of the autoencoder 401 and code model 404. Other loss functions can be used in some cases, such as when other training data is used. One example of another loss function includes a mean squared error (MSE), defined as $E_{total}=\Sigma\frac{1}{2}(target-output)^2$. The MSE calculates the sum of one-half times the actual answer minus the predicted (output) answer squared.

Based on the determined loss (e.g., the distance vector or other difference value) and using the backpropagation process, the parameters (e.g., weights, biases, etc.) of the neural network system of the autoencoder 401 and the code model 404 can be adjusted (effectively adjusting mappings between received image content and the latent code space) to reduce the loss between input uncompressed images and compressed image content generated as output by the autoencoder 401.

The loss (or error) may be high for the first training images, since the actual output values (a reconstructed image) may be much different than the input image. A goal of training is to minimize the amount of loss for the predicted output. The neural network can perform a backward pass by determining which nodes of the neural network (with corresponding weights) most contributed to the loss of the neural network, and can adjust the weights (and/or other parameters) so the loss decreases and is eventually minimized. A derivative of the loss with respect to the weights (denoted as dL/dW, where W are the weights at a particular layer) can be computed to determine the weights that most contributed to the loss of the neural network. For example, the weights can be updated so they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network system of the autoencoder 401 and the code model 404 can continue to be trained in such a manner until a desired output is achieved. For example, the autoencoder 401 and code model 404 can repeat the backpropagation process to minimize or otherwise reduce differences between an input image n and a reconstructed image n̂ resulting from decompression of a generated code z.

The autoencoder 421 and the code model 424 can be trained using similar techniques as that described above for training the autoencoder 401 and the code model 404 of the transmitting device 410. In some cases, the autoencoder 421 and the code model 424 can be trained using a same or a different training dataset used to train the autoencoder 401 and the code model 404 of the transmitting device 410.

In the example shown in FIG. 4, the rate-distortion autoencoders (the transmitting device 410 and the receiving device 420) are trained and run at inference according to a bitrate. In some implementations, a rate-distortion autoencoder can be trained at multiple bitrates to allow for generation and output of high quality reconstructed images or video frames (e.g., without or with limited artifacts due to distortion with respect to the input image) when varying amounts of information are provided in the latent codes z.

In some implementations, the latent codes z can be divided into at least two chunks $z_1$ and $z_2$. When the RD-AE model is used at a high-rate setting, both chunks are transmitted to a device for decoding. When the rate-distortion autoencoder model is used in a low-rate setting, only chunk $z_1$ is transmitted and chunk $z_2$ is inferred from on the decoder side. The inference of $z_2$ from $z_1$ can be performed using various techniques, as described in more detail below.

In some implementations, a set of continuous latents (e.g., which can convey a large amount of information) and corresponding quantized discrete latents (e.g., which contain less information) can be used. After training the RD-AE model, an auxiliary dequantization model can be trained. In some cases, when using the RD-AE, only the discrete latents are transmitted, and the auxiliary dequantization model is used on the decoder side to infer the continuous latents from the discrete latents.

While the system 400 is shown to include certain components, one of ordinary skill will appreciate that the system 400 can include more or fewer components than those shown in FIG. 4. For example, the transmitting device 410 and/or the receiving device 420 of the system 400 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 4. The components shown in FIG. 4, and/or other components of the system 400, can be implemented using one or more compute or processing components. The one or more compute components can include a central processing unit (CPU), a graphics processing unit (GPU), a digital signal processor (DSP), and/or an image signal processor (ISP). An illustrative example of a computing device and hardware components that can be implemented with the system 1400 is described below with respect to FIG. 14.

The system 400 can be part of, or implemented by, a single computing device or multiple computing devices. In some examples, the transmitting device 410 can be part of a first device and the receiving device 420 can be part of a second computing device. In some examples, the transmitting device 410 and/or the receiving device 420 can be included as part of an electronic device (or devices) such as a telephone system (e.g., a smartphone, a cellular telephone, a conferencing system, etc.), a desktop computer, a laptop or notebook computer, a tablet computer, a set-top box, a smart television, a display device, a gaming console, a video streaming device, a SOC, an IoT (Internet-of-Things) device, a smart wearable device (e.g., a head-mounted display (HMD), smart glasses, etc.), a camera system (e.g., a digital camera, an IP camera, a video camera, a security camera, etc.), or any other suitable electronic device(s). In some cases, the system 400 can be implemented by the image processing system 100 shown in FIG. 1. In other cases, the system 400 can be implemented by one or more other systems or devices.

Figure 5A:
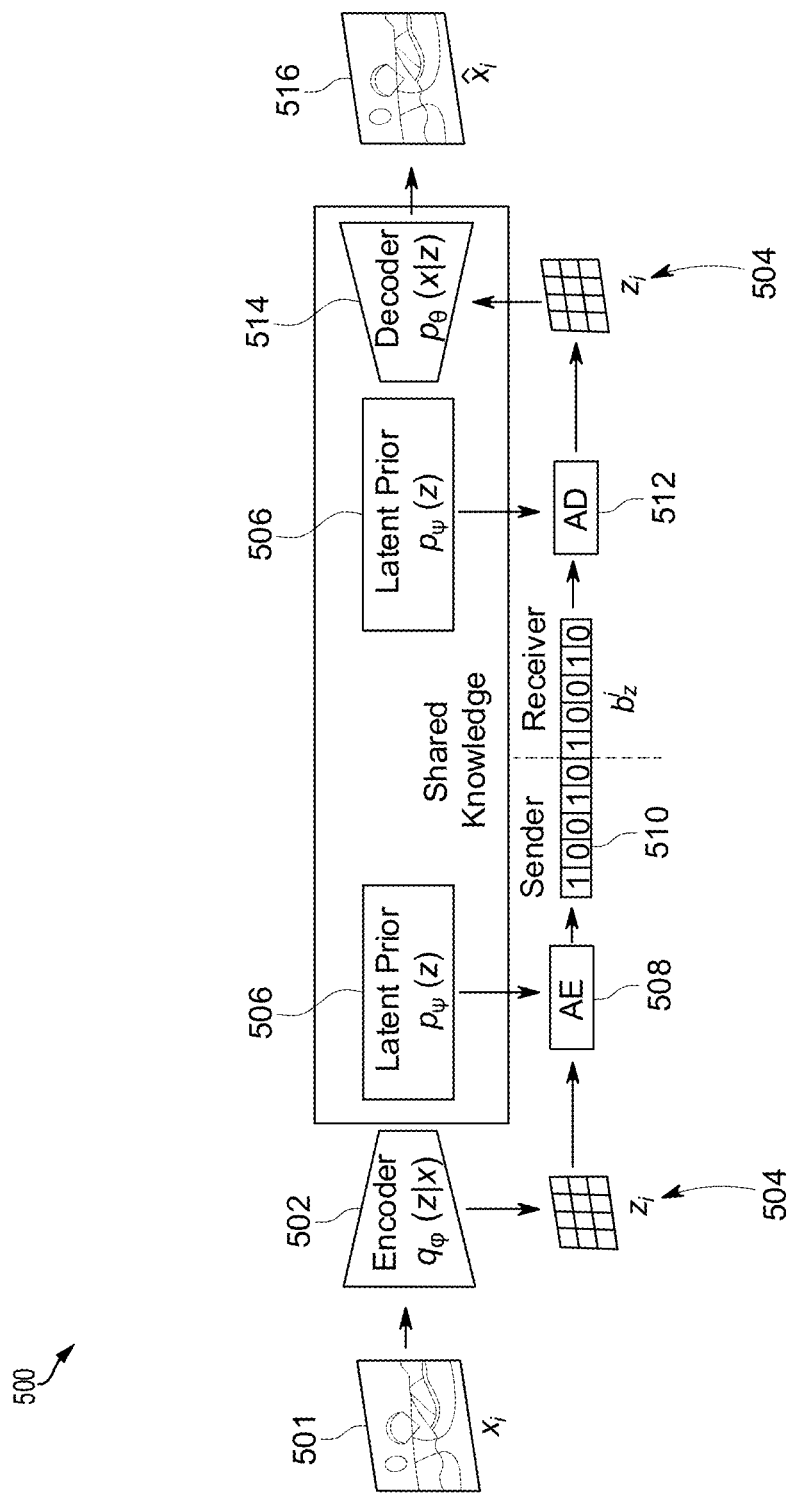
FIGS. 5A and 5B are diagrams illustrating example rate-distortion autoencoder systems, in accordance with some examples of the present disclosure.

FIG. 5A is a diagram illustrating an example neural network compression system 500. In some examples, the neural network compression system 500 can include an RD-AE system. In FIG. 5A, the neural network compression system 500 includes an encoder 502, an arithmetic encoder 508, an arithmetic decoder 512, and a decoder 514. In some cases, the encoder 502 and/or decoder 514 can be the same as encoder 402 and/or decoder 403, respectively. In other cases, the encoder 502 and/or decoder 514 can be different than encoder 402 and/or decoder 403, respectively.

The encoder 502 can receive an image 501 (image $x_i$) as input and can map and/or convert the image 501 (image $x_i$) to a latent code 504 (latent $z_i$) in a latent code space. The image 501 can represent a still image and/or a video frame associated with a sequence of frames (e.g., a video). In some cases, the encoder 502 can perform a forward pass to generate the latent code 504. In some examples, the encoder 502 can implement a learnable function. In some cases, the encoder 502 can implement a learnable function parameterized by $\varphi$. For example, the encoder 502 can implement function $q_\varphi(z|x)$. In some examples, the learnable function does not need to be shared with, or known by, the decoder 514.

The arithmetic encoder 508 can generate a bitstream 510 based on the latent code 504 (latent $z_i$) and a latent prior 506. In some examples, the latent prior 506 can implement a learnable function. In some cases, the latent prior 506 can implement a learnable function parameterized by $\psi$. For example, the latent prior 506 can implement function $p_\psi(z)$. The latent prior 506 can be used to convert latent code 504 (latent $z_i$) into bitstream 510 using lossless compression. The latent prior 506 can be shared and/or made available at both the sender side (e.g., the encoder 502 and/or the arithmetic encoder 508) and the receiver side (e.g., the arithmetic decoder 512 and/or the decoder 514).

The decoder 514 can receive encoded bitstream 510 from the arithmetic encoder 508 and use the latent prior 506 to decode latent code 504 (latent $z_i$) in the encoded bitstream 510. The decoder 514 can decode latent code 504 (latent $z_i$) into approximate reconstruction image 516 (reconstruction $\hat{x}_i$). In some cases, the decoder 514 can implement a learnable function parameterized by $\theta$. For example, the decoder 514 can implement function $p_\theta(x|z)$. The learnable function implemented by the decoder 514 can be shared and/or made available at both the sender side (e.g., the encoder 502 and/or the arithmetic encoder 508) and the receiver side (e.g., the arithmetic decoder 512 and/or the decoder 514).

The neural network compression system 500 can be trained to minimize the rate-distortion. In some examples, the rate reflects the length of the bitstream 510 (bitstream b), and the distortion reflects the distortion between the image 501 (image $x_i$) and the reconstruction image 516 (reconstruction $\hat{x}_i$). A parameter $\beta$ can be used to train a model for a specific rate-distortion ratio. In some examples, the parameter $\beta$ can be used to define and/or implement a certain tradeoff between rate and distortion.

In some examples, a loss can be denoted as follows: $L_{RD}(x; \varphi, \psi, \theta) = E_{q_{\varphi(z|x)}}[-\log p_\theta(x|z) - \beta \log p_\psi(z)]$, where the function E is an expectation. The distortion $(x|z; \theta)$ can be determined based on a loss function such as, for example, a mean squared error (MSE). In some examples, the terms $-\log p_\theta(x|z)$ can indicate and/or represent the distortion $D(x|z; \theta)$.

The rate for sending latents can be denoted $R_z(z;\psi)$. In some examples, the terms $\log p_\psi(z)$ can indicate and/or represent the rate $R_z(z;\psi)$. In some cases, the loss can be minimized over the full dataset D as follows: $\varphi_D^*, \psi_D^*, \theta_D^* = \text{argmin } E_{x \sim D}[L_{RD}(x;\varphi,\psi,\theta)]$.

Figure 5B:
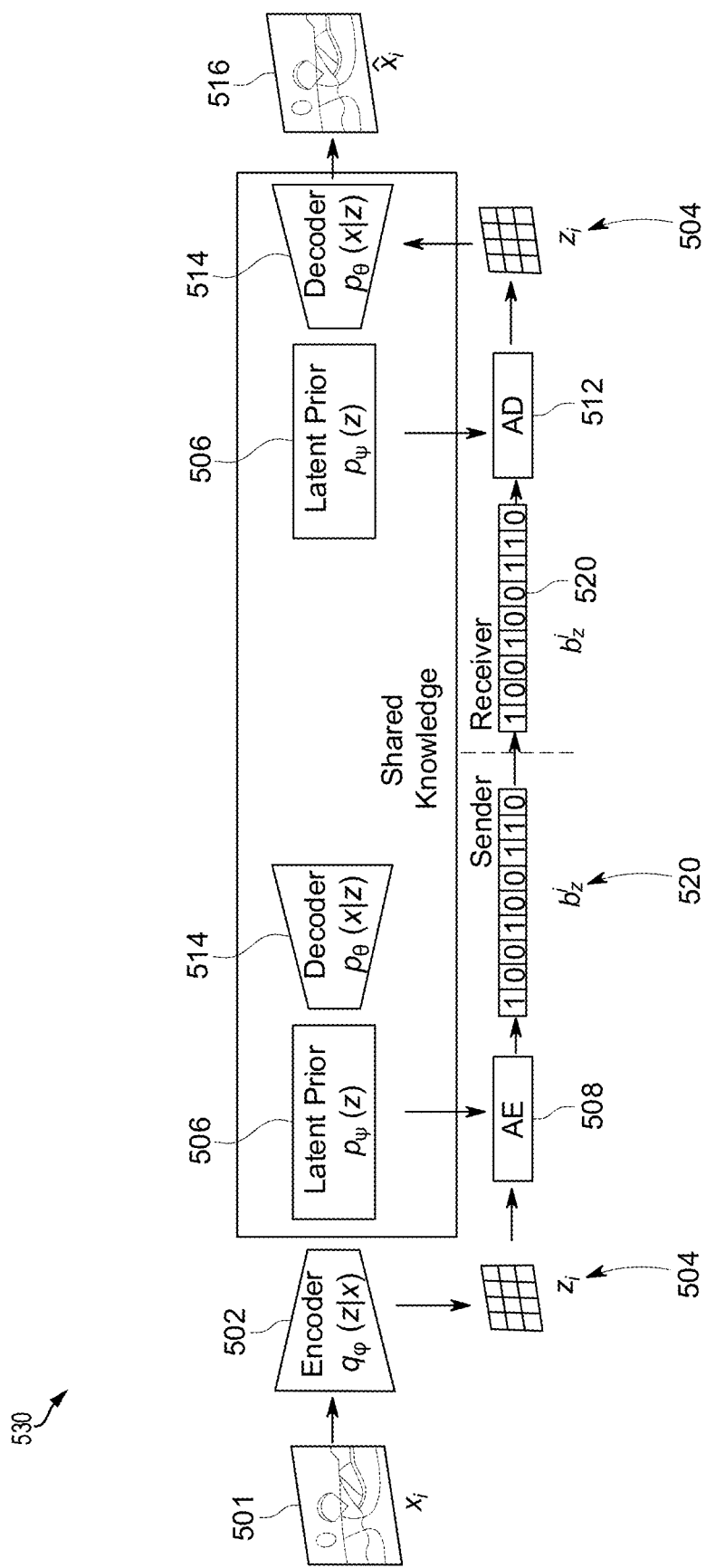

FIG. 5B is a diagram illustrating an inference process 530 performed by the neural network compression system 500. As shown, the encoder 502 can convert image 501 to latent code 504. In some examples, the image 501 can represent a still image and/or a video frame associated with a sequence of frames (e.g., a video).

In some examples, the encoder 502 can encode image 501 using a single forward pass $z = q_{\varphi_D^*}(z|x)$. The arithmetic encoder 508 can then perform arithmetic coding of latent code 504 (latent $z_i$) under the latent prior 506 to generate bitstream 520 ($b_z^i$). In some examples, the arithmetic encoder 508 can generate the bitstream 520 as follows: $b_z^i = AE(z | p_{\psi_D^*}(z))$.

The arithmetic decoder 512 can receive the bitstream 520 from the arithmetic encoder 508 and perform arithmetic decoding of latent code 504 (latent $z_i$) under the latent prior 506. In some examples, the arithmetic decoder 512 can decode the latent code 504 from the bitstream 520 as follows: $z = AD(b_z^i | p_{\psi_D^*}(z))$. The decoder 514 can decode latent code 504 (latent $z_i$) and generate reconstruction image 516 (reconstruction $\hat{x}_i$). In some examples, the decoder 514 can decode latent code 504 (latent $z_i$) using a single forward pass as follows: $\hat{x} = p_{\theta_D^*}(x|z)$.

In some examples, an RD-AE system can be trained using a set of training data and further fine-tuned for the datapoint (e.g., image data, video data, audio data) to be transmitted to and decoded by a receiver (e.g., a decoder). For example, at inference time, the RD-AE system can be fine-tuned on the image data being transmitted to the receiver. Since compression models are generally large, sending the parameters associated with the model to the receiver can be very costly in terms of resources such as network (e.g., bandwidth, etc.), storage and compute resources. In some cases, the RD-AE system can be fine-tuned on a single datapoint being compressed and sent to a receiver for decompression. This can limit the amount of information (and associated cost) that is sent to the receiver, while maintaining and/or increasing a compression/decompression efficiency, performance, and/or quality.

Figure 6:
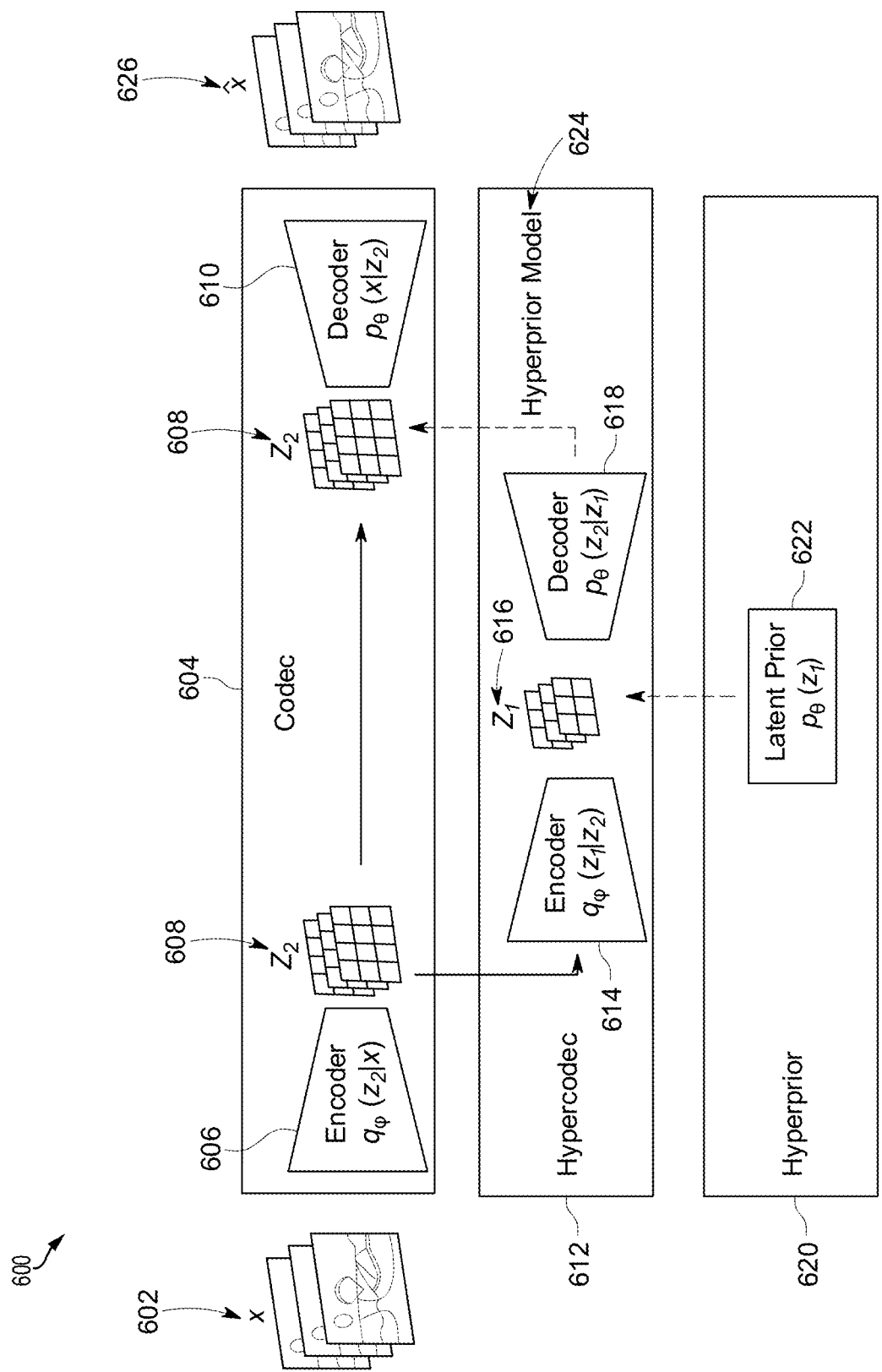
FIG. 6 is a diagram illustrating an example neural network compression system for instance-adaptive data compression, in accordance with some examples of the present disclosure.

FIG. 6 is a diagram illustrating an example neural network compression system 600 for instance-adaptive data compression. The neural network compression system 600 can be trained and further fine-tuned for the data being compressed to provide compression adapted/fine-tuned to that data being compressed (e.g., instance adapted). In this example, the neural network compression system 600 is shown implementing a mean-scale hyperprior model architecture using a variable autoencoder (VAE) framework. In some cases, a shared hyperdecoder can be used to predict the mean and scale parameters for the mean-scale hyperprior model.

As shown in FIG. 6, the neural network compression system 600 can be trained using a training dataset 602. The training dataset 602 can be processed by an encoder 606 of a codec 604 to generate a latent space representation 608 ($z_2$) of the training dataset 602. The encoder 606 can provide the latent space representation 608 ($z_2$) to a decoder 610 of the codec 604 and a hyperencoder 614 of a hypercodec 612.

The hyperencoder 614 can use the latent space representation 608 ($z_2$) and a latent prior 622 of a hyperprior 620 to generate a hyperlatent space representation 616 ($z_1$) of the training dataset 602. In some examples, the hyperlatent space representation 616 ($z_1$) and the hyperlatent space representation 616 ($z_1$) can provide a hierarchical latent variable model for latent space z={$z_1$, $z_2$}.

A hyperdecoder 618 of the hypercodec 612 can use the hyperlatent space representation 616 ($z_1$) to generate a hyperprior model 624. The hyperdecoder 618 can predict mean and scale parameters for the hyperprior model 624. In some examples, the hyperprior model 624 can include a probability distribution over the parameters of the latent space representation 608 ($z_2$) and the hyperlatent space representation 616 ($z_1$). In some examples, the hyperprior model 624 can include a probability distribution over the parameters of the latent space representation 608 ($z_2$), the hyperlatent space representation 616 ($z_1$), and the hyperdecoder 618.

The decoder 610 can use the hyperprior model 624 and the latent space representation 608 ($z_2$) to generate the reconstructed data 626 (reconstruction $\hat{x}$) for the training dataset 602.

In some examples, during training, the neural network compression system 600 can implement a mixed quantization strategy, where the quantized latent space representation 608 ($z_2$) is used to calculate the distortion loss, and noisy samples for latent space representation 608 ($z_2$) and the hyperlatent space representation 616 ($z_1$) are used when computing the rate loss.

Figure 7:
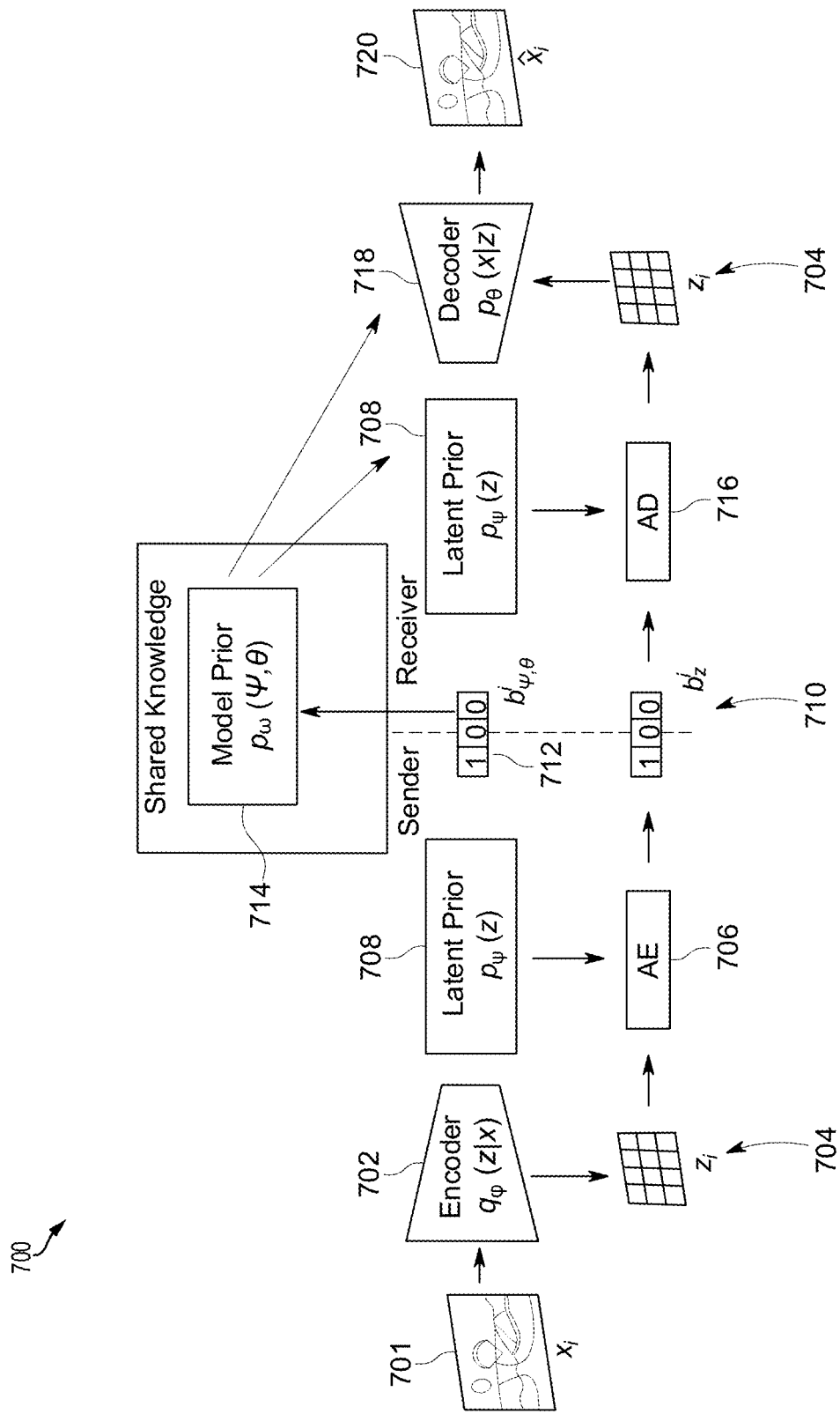
FIG. 7 is a diagram illustrating an example architecture of a neural network compression system fine-tuned (e.g., instance adapted) using a model prior, in accordance with some examples of the present disclosure.

FIG. 7 is a diagram illustrating an example architecture of a neural network compression system 700 fine-tuned (e.g., instance adapted) using a model prior. In some examples, the neural network compression system 700 can include an RD-AE system fine-tuned using an RDM-AE model prior. The neural network compression system 700 can include an encoder 702, an arithmetic encoder 706, an arithmetic decoder 716, and decoder 718. In some cases, the encoder 702 can be the same as or different than encoder 402, encoder 502, or encoder 606, and the decoder 718 can be the same as or different than decoder 403, decoder 514, or decoder 610. The arithmetic encoder 706 can be the same as or different than the arithmetic coder 406 or the arithmetic encoder 508, and the arithmetic decoder 716 can be the same as or different than the arithmetic decoder 426 or 508.

The encoder 702 can receive an image 701 (image $x_i$) as input and can map and/or convert the image 701 (image $x_i$) to a latent code 704 (latent $z_i$) in a latent code space. In some examples, the image 701 can represent a still image and/or a video frame associated with a sequence of frames (e.g., a video). In some examples, prior to processing the image 701, the encoder 702 can be trained on a training dataset (e.g., training dataset 602 of FIG. 6). Moreover, the encoder 702 can be further trained or fine-tuned (e.g., instance adapted) for the image 701. For example, the image 701 can be used to fine-tune the encoder 702 for the image 701. The fine-tuning of the encoder 702 for the image 701 can result in a high compression performance for the image 701. For example, the fine-tuning of the encoder 702 can allow the neural network compression system 700 to improve the rate-distortion of the compressed image 701.

In some cases, the encoder 702 can generate the latent code 704 using a single forward pass. In some examples, the encoder 702 can implement a learnable function. In some cases, the learnable function can be parameterized by $\varphi$. For example, the encoder 702 can implement function $q_\varphi(z|x)$. In some examples, the learnable function does not need to be shared with, or known by, the arithmetic decoder 716 and/or the decoder 718.

The arithmetic encoder 706 can use a latent prior 708 to entropy code the latent code 704 and generate a bitstream 710 (e.g., bitstream $b_z^i$) to be transmitted to the arithmetic decoder 716. The bitstream 710 can include compressed data representing the latent code 704. The latent prior 708 can be used to convert latent code 704 (latent $z_i$) into bitstream 710 using lossless compression. The latent prior 708 can be shared and/or made available at both the sender side (e.g., the encoder 702 and/or the arithmetic encoder 706) and the receiver side (e.g., the arithmetic decoder 716 and/or the decoder 718). In some examples, the latent prior 708 can implement a learnable function. In some cases, the learnable function parameterized by $\psi$. For example, the latent prior 708 can implement function $p_\psi(z)$.

The neural network compression system 700 can also include a model prior 714. The model prior 712 can include a probability distribution over the parameters of the latent prior 708 and the decoder 718. In some examples, the model prior 714 can implement a learnable function. In some cases, the learnable function parameterized by $\omega$. For example, the model prior 712 can implement function $p_\omega(\psi|\theta)$. The neural network compression system 700 can use the model prior 714 to convert fine-tuned parameters of the encoder 702 and latent prior 708 into a bitstream 712 (e.g., bitstream $b_{\psi,\theta}^i$) to be transmitted to the arithmetic decoder 716.

The model prior 712 can be shared and/or made available at both the sender side (e.g., the encoder 702 and/or the arithmetic encoder 706) and the receiver side (e.g., the arithmetic decoder 716 and/or the decoder 718). For example, the arithmetic encoder 706 can transmit the bitstream 712 to the arithmetic decoder 716 for use in decoding the bitstream 710 generated from the latent code 704. The bitstream 712 can include compressed data representing the fine-tuned parameters of the encoder 702 and the latent prior 708, which the arithmetic decoder 716 can use to obtain the fine-tuned parameters of the encoder 702 and the latent prior 708. The arithmetic decoder 716 and the decoder 718 can reconstruct the image 701 based on the latent code 704 obtained from the bitstream 710 and the fine-tuned parameters of the encoder 702 and the latent prior 708 obtained from the bitstream 712.

The arithmetic decoder 716 can use the latent prior 708 and model prior 714 to convert the bitstream 710 into the latent code 704 (latent $z_i$). For example, the arithmetic decoder 716 can use the latent prior 708 and model prior 714 to decode the bitstream 710. The decoder 718 can use the latent code 704 (latent $z_i$) decoded by the arithmetic decoder 716 to generate a reconstructed image 720 (reconstruction $\hat{x}_i$). For example, the decoder 718 can decode latent code 704 (latent $z_i$) into approximate reconstruction image 720 (reconstruction $\hat{x}_i$). In some examples, the decoder 718 can use the latent code 704, the latent prior 708 and/or the model prior 714 to generate the reconstructed image 720.

In some cases, the decoder 718 can implement a learnable function parameterized by $\theta$. For example, the decoder 718 can implement learnable function $p_\theta(x|z)$. The learnable function implemented by the decoder 718 can be shared and/or made available at both the sender side (e.g., the encoder 702 and/or the arithmetic encoder 706) and the receiver side (e.g., the arithmetic decoder 716 and/or the decoder 718).

In some examples, at the encoder side, the model can be fine-tuned on the image 701 (image $x_i$) using a rate-distortion-model (RDM) loss as follows: $\varphi_D^*, \psi_D^*, \theta_D^* = \text{argmin } L_{RD}(x; \varphi, \psi, \theta, \omega)$. In some examples, the image 701 (image $x_i$) can be encoded using a single forward pass of the fine-tuned encoder 702 as follows $z = q_{\varphi_x^*}(z|x)$. In some cases, the fine-tuned latent prior 708 can be entropy-coded as follows $b_\psi^i = AE(\psi_x^* | p_\omega(\psi))$, and the fine-tuned decoder 718 and/or the arithmetic encoder 706 can be entropy-coded as follows $b_\theta^i = AE(\theta_x^* | p_\omega(\theta))$. In some cases, the latent code 704 (latent $z_i$) can be entropy-coded as follows $b_z^i = AE(z | p_{\varphi_x^*}(z))$.

At the decoder side, in some examples, the fine-tuned latent prior 708 can be entropy-coded as follows $\psi_x^* = AD(b_\psi^i | p_\omega(\psi))$, and the fine-tuned decoder 718 and/or the arithmetic decoder 716 can be entropy-coded as follows $\theta_x^* = AD(b_\theta^i | p_\omega(\theta))$. In some cases, the latent code 704 (latent $z_i$) can also be entropy-coded as follows $z = AD(b_z^i | p_{\psi_x^*}(z))$.

In some examples, the decoder 718 can decode the latent code 704 (latent $z_1$) into approximate reconstruction image 720 (reconstruction $\hat{x}_i$) using a single forward pass of the fine-tuned decoder (e.g., decoder 718) as follows $\hat{x} = p_{\theta_x^*}(x|z)$.

Figure 8:
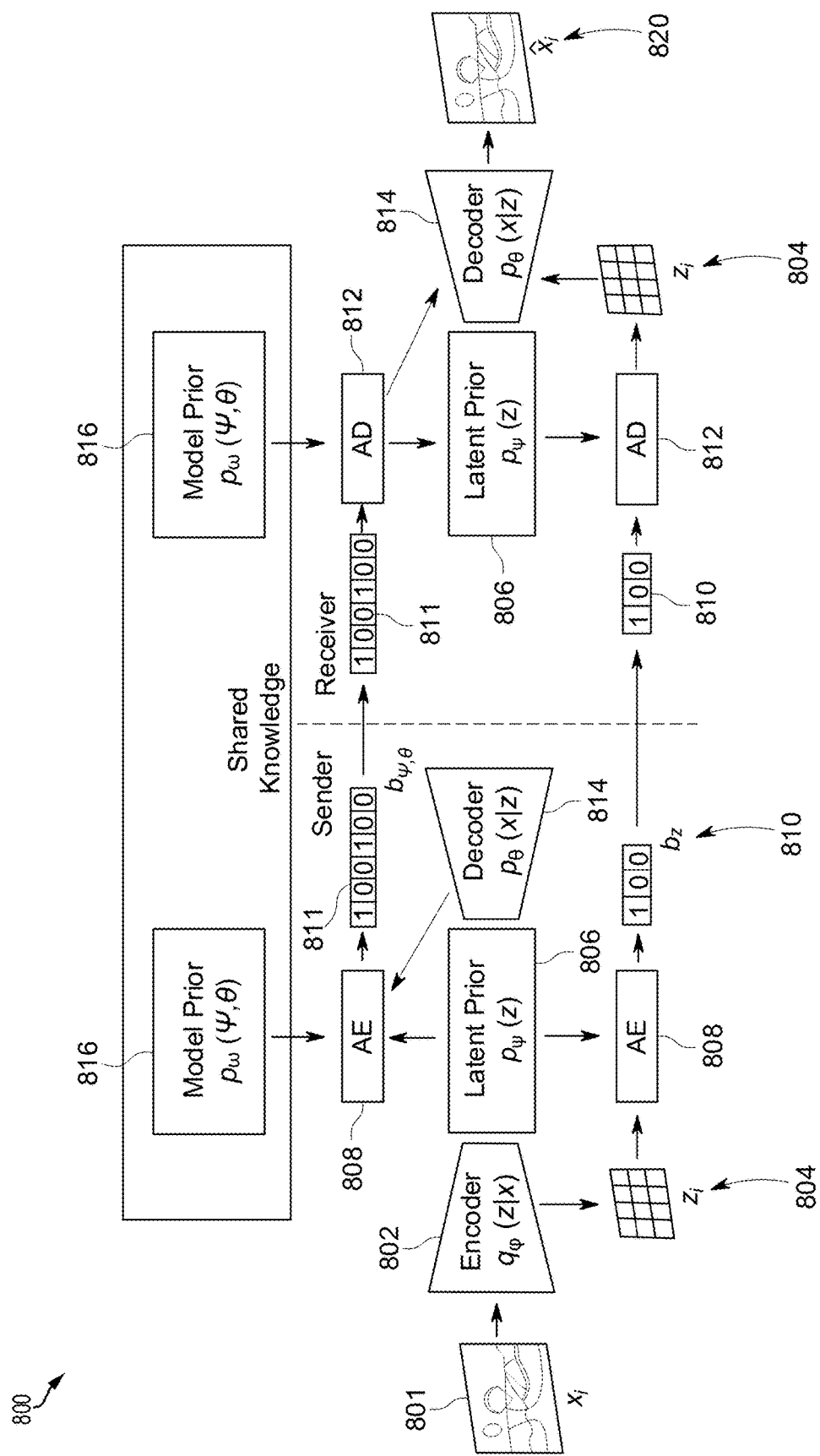
FIG. 8 is a diagram illustrating an example inference process implemented by an example neural network compression system fine-tuned using a model prior, in accordance with some examples of the present disclosure.

FIG. 8 is a diagram illustrating an example inference process implemented by an example neural network compression system 800 fine-tuned using a model prior. In some examples, the neural network compression system 800 can include an RD-AE system fine-tuned using an RDM-AE model prior. In some cases, the neural network compression system 800 can include an AE model fine-tuned using the model prior.

In this illustrative example, the neural network compression system 800 includes the encoder 802, the arithmetic encoder 808, the arithmetic decoder 812, the decoder 814, a model prior 816 and latent prior 806. In some cases, the encoder 802 can be the same as or different than encoder 402, encoder 502, encoder 606, or encoder 702, and the decoder 814 can be the same as or different than decoder 403, decoder 514, decoder 610, or decoder 718. The arithmetic encoder 808 can be the same as or different than the arithmetic coder 406, the arithmetic encoder 508, or the arithmetic encoder 706, and the arithmetic decoder 812 can be the same as or different than the arithmetic decoder 426, the arithmetic decoder 508, or the arithmetic decoder 716.

The neural network compression system 800 can generate latent code 804 (latent $z_i$) for the image 801. The neural network compression system 800 can use the latent code 804 and the latent prior 806 to encode the image 801 (image $x_i$) and generate a bitstream 810 that can be used by a receiver to generate a reconstruction image 820 (reconstruction $\hat{x}_i$). In some examples, the image 801 can represent a still image and/or a video frame associated with a sequence of frames (e.g., a video).

In some examples, the neural network compression system 800 can be fine-tuned using an RDM-AE loss. The neural network compression system 800 can be trained by minimizing the rate-distortion-model rate (RDM) loss. In some examples, at the encoder side, the AE model can be fine-tuned on the image 801 (image $x_i$) using an RDM loss as follows: $\varphi_D^*, \psi_D^*, \theta_D^* = \text{argmin } L_{RD}(x; \varphi, \psi, \theta, \omega)$.

The fine-tuned encoder 802 can encode the image 801 (image $x_i$) to generate a latent code 804. In some cases, the fine-tuned encoder 802 can encode the image 801 (image $x_i$) using a single forward pass as follows $z = q_{\varphi_x^*}(z|x)$. The arithmetic encoder 808 can use the latent prior 806 to convert the latent code 804 into a bitstream 810 for the arithmetic decoder 812. The arithmetic encoder 808 can entropy-code parameters of the fine-tuned decoder 814 and the fine-tuned latent prior 806 under the model prior 816, and generate a bitstream 811 including the compressed parameters of the fine-tuned decoder 814 and the fine-tuned latent prior 806. In some examples, the bitstream 811 can include updated parameters of the fine-tuned decoder 814 and the fine-tuned latent prior 806. The updated parameters can include, for example, parameter updates relative to a baseline decoder and latent prior, such as the decoder 814 and latent prior 806 prior to fine-tuning.

In some cases, the fine-tuned latent prior 806 can be entropy-coded under the model prior 816 as follows $b_\psi^i = AE(\psi_x^* | p_\omega(\psi))$, the fine-tuned decoder 814 can be entropy-coded under the model prior 816 as follows $b_\theta^i = AE(\theta_x^* | p_\omega(\theta))$, and the latent code 804 (latent $z_i$) can be entropy-coded under the fine-tuned latent prior 806 as follows $b_z^i = AE(z | p_{\psi_x^*}(z))$. In some cases, at the decoder side, the fine-tuned latent prior 806 can be entropy-coded under the model prior 816 as follows $\psi_x^* = AD(b_\psi^i | p_\omega(\psi))$, the fine-tuned decoder 814 can be entropy-coded under the model prior 816 as follows $\theta_x^* = AD(b_\theta^i | p_\omega(\theta))$, and the latent code 804 (latent $z_1$) can be entropy-coded under the fine-tuned latent prior 806 as follows $z = AD(b_z^i | p_{\psi_x^*}(z))$.

The decoder 814 can decode the latent code 804 (latent $z_i$) into approximate reconstruction image 820 (reconstruction $\hat{x}_i$). In some examples, the decoder 814 can decode the latent code 804 using a single forward pass of the fine-tuned decoder as follows $\hat{x} = p_{\theta_x^*}(x|z)$.

As previously explained, the neural network compression system 800 can be trained by minimizing the RDM loss. In some cases, the rate can reflect the length of the bitstream b (e.g., bitstream 810 and/or 811), distortion can reflect the distortion between the input image 801 (image $x_i$) and the reconstruction image 820 (reconstruction $\hat{x}_i$), and the model-rate can reflect the length of the bitstream used and/or needed to send model updates (e.g., updated parameters) to a receiver (e.g., to decoder 814). A parameter β can be used to train a model for a specific rate-distortion ratio.

In some examples, a loss for the datapoint x can be minimized at inference time as follows: $\varphi_x^*, \psi_x^*, \theta_x^* = \text{argmin } \mathcal{L}_{RDM}(x; \varphi, \psi, \theta, \omega)$. In some examples, the RDM loss can be denoted as follows: $L\_RDM(x; \varphi, \psi, \theta, \omega) = E_{q_\varphi} q\_(z|x)[-\log p_\theta(x|z) - \beta \log p_\psi(z) - \beta \log p_\omega(\psi, \theta)]$. In some cases, the distortion $D(x|z; \theta)$ can be determined based on a loss function such as, for example, a mean squared error (MSE).

The terms $-\log p_\theta(x|z)$ can indicate and/or represent the distortion $D(x|z; \theta)$. The terms $\beta \log p_\psi(z)$ can indicate and/or represent the rate for sending latents $R_z(z; \psi)$, and the terms $\beta \log p_\omega(\psi, \theta)$ can indicate and/or represent the rate for sending fine-tuned model updates $R_{\psi,\theta}(\psi, \theta; \omega)$.

In some cases, the model prior 816 can reflect the length of the bitrate overhead for sending model updates. In some examples, the bitrate for sending model updates can be described as follows: $|b_{\psi,\theta}^i| = R_{\psi,\theta}(\psi, \theta; \omega) = -\log p_\omega(\psi, \theta)$. In some cases, the model prior can be selected so that sending a model without updates is cheap, that is, the bitlength (model-rate-loss) is small: $R_{\psi,\theta}(\psi_D^*, \theta_D^*; \omega)$.

In some cases, using the RDM loss function, the neural network compression system 800 may only add bits to the bitstream for the model updates $b_{\psi,\theta}^i$ if the latent rate or distortion decreases with at least as many bits. This may provide a boost to rate-distortion (R/D) performance. For example, the neural network compression system 800 may increase the number of bits in the bitstream 811 for sending model updates if it can also decrease the rate or distortion with at least the same number of bits. In other cases, the neural network compression system 800 may add bits to the bitstream for the model updates $b_{\psi,\theta}^i$ even if the latent rate or distortion does not decrease with at least as many bits.

The neural network compression system 800 can be trained end-to-end. In some cases, the RDM loss can be minimized at inference time end-to-end. In some examples, a certain amount of compute can be spent once (e.g., fine-tuning the model) and high compression ratios can be subsequently obtained without extra cost to the receiver side. For example, a content provider may spend a high amount of compute to more extensively train and fine-tune the neural network compression system 800 for a video that will be provided to a large number of receivers. The highly trained and fine-tuned neural network compression system 800 can provide a high compression performance for that video. Having spent the high amount of compute, the video provider can store the updated parameters of the model prior and efficiently provide to each receiver of the compressed video to decompress the video. The video provider can achieve large benefits in compression (and reduction in network and compute resources) with each transmission of the video which can significantly outweigh the initial compute costs of training and fine-tuning the model.

Due to the large number of pixels in video and high resolution images, the learning and fine-tuning approaches herein can be very advantageous for video compression and/or high resolution images. In some cases, complexity and/or decoder compute can be used as added considerations for the overall system design and/or implementation. For example, very small networks that are fast to do inference on can be fine-tuned. As another example, a cost term can be added for receiver complexity, which can force and/or cause the model to remove one or more layers. In some examples, more complex model priors can be learned using machine learning to achieve even larger gains.

A model prior design can include various attributes. In some examples, the model prior implemented can include a model prior that assigns a high probability $p_\omega(\psi_D^*, \theta_D^*)$ for sending a model without any updates, and thus a low bitrate: $R_{\psi,\theta}(\psi_D^*, \theta_D^*; \omega)$. In some cases, the model prior can include a model prior that assigns a non-zero probability to values around $\omega_D^*$, $\theta_D^*$ so different instances of fine-tuned models can be encoded in practice. In some cases, the model prior can include a model prior that can be quantized at inference time and used to do entropy coding.

Figure 9:
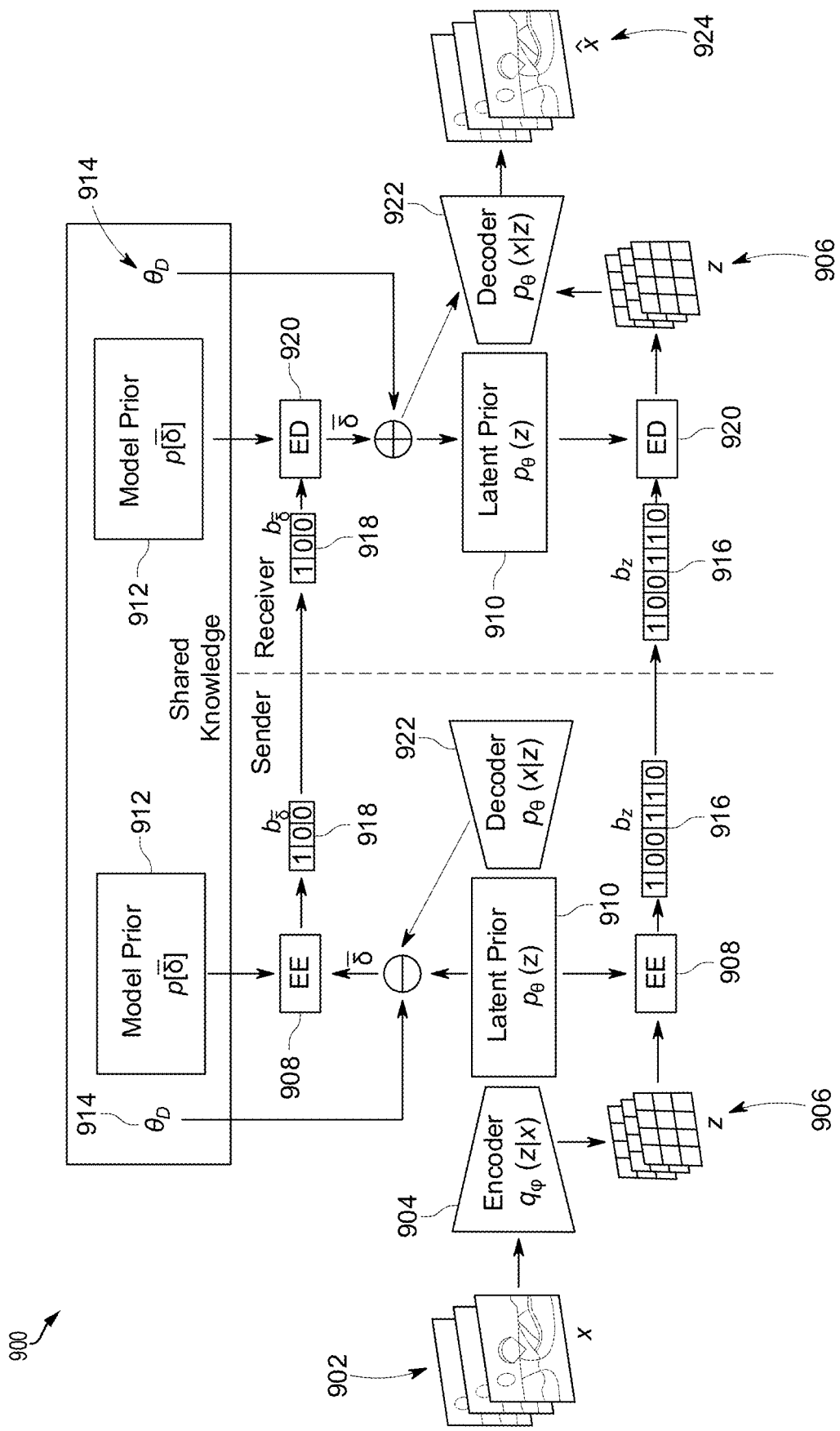
FIG. 9 is a diagram illustrating encoding and decoding tasks performed by an example neural network compression system fine-tuned using a model prior, in accordance with some examples of the present disclosure.

FIG. 9 is a diagram illustrating encoding and decoding tasks performed by an example neural network compression system 900 fine-tuned using a model prior. In this example, the encoder 904 receives image 902 and compresses the image 902 to latent space 906 (z). The arithmetic encoder 908 can use the latent prior 910, parameters of the decoder 922, and global model parameters 914 ($\theta_D$) pretrained on a training set D, to compute quantized model parameters ($\bar{\theta}$).

In some examples, the quantized model parameters ($\bar{\theta}$) can represent a sum of the global model parameters 914 ($\theta_D$) pretrained on the training set D and quantized model parameter updates ($\bar{\delta}$). In some examples, the quantized model parameter updates ($\bar{\delta}$) can be generated by a quantizer ($Q_t$) based on a difference between the global model parameters 914 ($\theta_D$) pretrained on the training set D and model parameter updates ($\theta$).

The arithmetic encoder 908 can entropy encode the quantized model parameter updates ($\bar{\delta}$) to generate a bitstream 918 for signaling model parameters updates to a receiver (e.g., arithmetic decoder 920). The arithmetic encoder 908 can use a quantized model prior 912 ($p[\bar{\delta}]$) to entropy encode the quantized model parameter updates ($\bar{\delta}$). In some examples, the arithmetic encoder 908 can implement a continuous model prior ($p(\delta)$) to regularize the model parameter updates ($\delta$), and use the quantized model prior 912 ($p[\bar{\delta}]$) to entropy encode the quantized model parameter updates ($\bar{\delta}$).

The arithmetic encoder 908 can also entropy encode the latent space 906 (z) to generate a bitstream 916 for signaling the latent space 906 (z) to a receiver (e.g., arithmetic decoder 920). In some examples, the arithmetic encoder 908 can concatenate the bitstream 916 and the bitstream 918 and transmit the concatenated bitstream to the receiver (e.g., arithmetic decoder 920).

The arithmetic decoder 920 can use the quantized model prior 912 ($p[\bar{\delta}]$) to entropy decode the bitstream 918 and obtain the quantized model parameter updates ($\bar{\delta}$). The arithmetic decoder 920 can use the fine-tuned latent prior 910 to entropy decode the latent space 906 (z) from the bitstream 916. The decoder 922 can use the latent space 906 and the model parameter updates to generate the reconstructed image 924.

In some examples, the neural network compression system 900 can implement Algorithm 1 below during the encoding process, and Algorithm 2 below during the decoding process.

| Algorithm 1 Encoding of x | |
|---|---|
| Input: | Global model parameters $\{\emptyset_D, \theta_D\}$ pretrained on training set D, model parameter quantizer $Q_t$, model prior $p[\bar{\delta}]$, and datapoint x to be compressed. |
| Output: | Compressed bitstream b. |
| 1: | Initialize model parameters: $\emptyset = \emptyset_D$ and $\theta = \theta_D$ |
| 2: | for step in MAX STEPS do |
| 3: | Sample a selection of one or more frames from: $x_f \sim x$ |
| 4: | Quantize transmittable parameters: $\bar{\theta} \leftarrow Q_t(\delta) + \theta_D$, with $\delta = \theta - \theta_D$ |
| 5: | Forward pass: $z \sim q_\emptyset(z\|x_f)$ and evaluate $p_{\bar{\theta}}(x_f\|z)$ and $p_{\bar{\theta}}(z)$ |
| 6: | Compute loss $L_{RDM}(\emptyset, \delta)$ on $x_f$ according to Equation (2) below. |
| 7: | Backpropagate using STE for $Q_t$, then update $\emptyset$, $\theta$ using gradients $\frac{\partial L_{RDM}}{\partial \emptyset}$ and $\frac{\partial L_{RDM}}{\partial \emptyset}$ |
| 8: | end for |
| 9: | Compress x to $z \sim q_\emptyset(x)$ |

-continued

Algorithm 1 Encoding of x

10: Compute quantized model parameters: $\bar{\theta} = \theta_D + \bar{\delta}$, with $\bar{\delta} = Q_r(\bar{\theta} - \theta_D)$
11: Entropy encode: $b_{\bar{\delta}} = \text{enc}(\bar{\delta}; p[\bar{\delta}])$ and $b_z = \text{enc}(z; p_{\bar{\theta}}(z))$
12: Concatenate bitstreams: $b = (b_{\bar{\delta}}, b_z)$ Algorithm 2 Decoding of x Input: Model prior $p[\bar{\delta}]$, bitstream $b = (b_{\bar{\delta}}, b_z)$,
Global model parameters $\theta_D$
Output: Decoded datapoint $\hat{x}$
1: Entropy decode: $\bar{\delta} = \text{dec}(b_{\bar{\delta}}; p[\bar{\delta}])$
2: Compute updated model parameters: $\bar{\theta} = \theta_D + \bar{\delta}$
3: Entropy decode latent under fine-tuned prior: $z = \text{dec}(b_z; p_{\bar{\theta}}(z))$
4: Decode instance as the mean of the fine-tuned decoder: $p_{\bar{\theta}}(x \mid z)$ In some examples, Equation (2) referenced above can be used to compute an RDM loss as follows:

$$L_{RDM}(\emptyset, \delta) = L_{RD}(\emptyset, \theta_D + \bar{\delta}) - \beta \log p(\delta) \quad \text{Equation (2)}$$

Where the term $\log p(\delta)$ represents the model updates M, and $\beta$ is a tradeoff parameter.

In some examples, the model prior 912 can be designed as a probability density function (PDF). In some cases, the parameter update $\delta = \theta - \theta_D$ can be modeled using Gaussian distribution centered around a zero-update. In some cases, the model prior can be defined on the updates as a multivariate zero-centered Gaussian with zero covariance, and a single shared (hyperparameter) $\sigma$, denoting the standard deviation $p(\delta) = \mathcal{N}(\delta \mid 0, \sigma I)$, which can be equivalent to modeling $\theta$ by $p(\theta) = \mathcal{N}(\theta \mid \theta_D, \sigma I)$.

In some cases, when entropy coding the quantized updates $\bar{\delta}$ under $p[\bar{\delta}]$, even zero updates may not be free. In some cases, these initial static costs can be defined as $\overline{M_0} = -\log p[\bar{\delta}=0]$. Because the mode of the defined model prior is zero, these initial costs $\overline{M_0}$ may equal the minimum costs. Minimization of Equation (2) above can ensure that after overcoming these static costs, any extra bit spent on model updates can be accompanied by a commensurate improvement in RD performance.

In some cases, the model prior design can be based on an independent Gaussian network prior where independence between parameters can be assumed as follows: $p_\omega(\omega, \theta) = \Pi_{\theta^{(i)} \in \theta} p_\omega(\theta^{(i)}) \Pi_{\psi^{(i)} \in \psi} p_\omega(\omega^{(i)})$. In various examples herein, equations and examples for a single parameter $p_\omega(\theta^{(i)})$ are provided. However, other examples may involve equations for multiple parameters.

In some examples, a Gaussian model prior can include a Gaussian centered around a global model RDAE model with variable standard deviation $\sigma$ as follows: $p_\omega(\theta^{(i)}) = \mathcal{N}(\theta_D^{*(i)}, \sigma)$.

In some cases, there can be a tradeoff between higher $\sigma$ (e.g., higher cost for sending untuned model (initial cost)) and lower $\sigma$ (e.g., more limited probability mass for fine-tuning models).

In some examples, the model prior design can be based on an independent Laplace model prior. In some examples, a Laplace model prior can include a Gaussian centered around a global model RDAE model with variable standard deviation a as follows: $p_\omega(\theta^{(i)}) = L(\theta_D^{*(i)}, \sigma)$.

In some cases, there can be a tradeoff between higher $\sigma$ (e.g., higher cost for sending untuned model (initial cost)) and lower $\sigma$ (e.g., more limited probability mass for fine-tuning models). In some examples, the model can enforce sparsity of parameter updates.

In some cases, the model prior design can be based on an independent Spike and Slab model prior. In some examples, a Spike and Slab model prior can include a Gaussian centered around a global model RDAE model with variable standard deviation $\sigma_{slab}$ for the slab component, a variable standard deviation for the spike component $\sigma_{spike} \ll \sigma_{slab}$, and a Spike/Slab ratio $\alpha$ as follows:

$$p_\omega(\theta^{(i)}) = \frac{1}{c}(\mathcal{N}(\theta_D^{*(i)}, \sigma_{slab}) + \alpha \mathcal{N}(\theta_D^{*(i)}, \sigma_{spike})).$$

In some examples, there can be a low cost for sending untuned model (initial cost) when $\alpha$ is large, and broad support for fine-tuning models.

In some examples, a model prior and global AE model can be trained jointly. In some cases, instead of setting the parameters $\omega$ manually, the model prior can be trained end-to-end together with the instance RDM-AE models.

Figure 10:
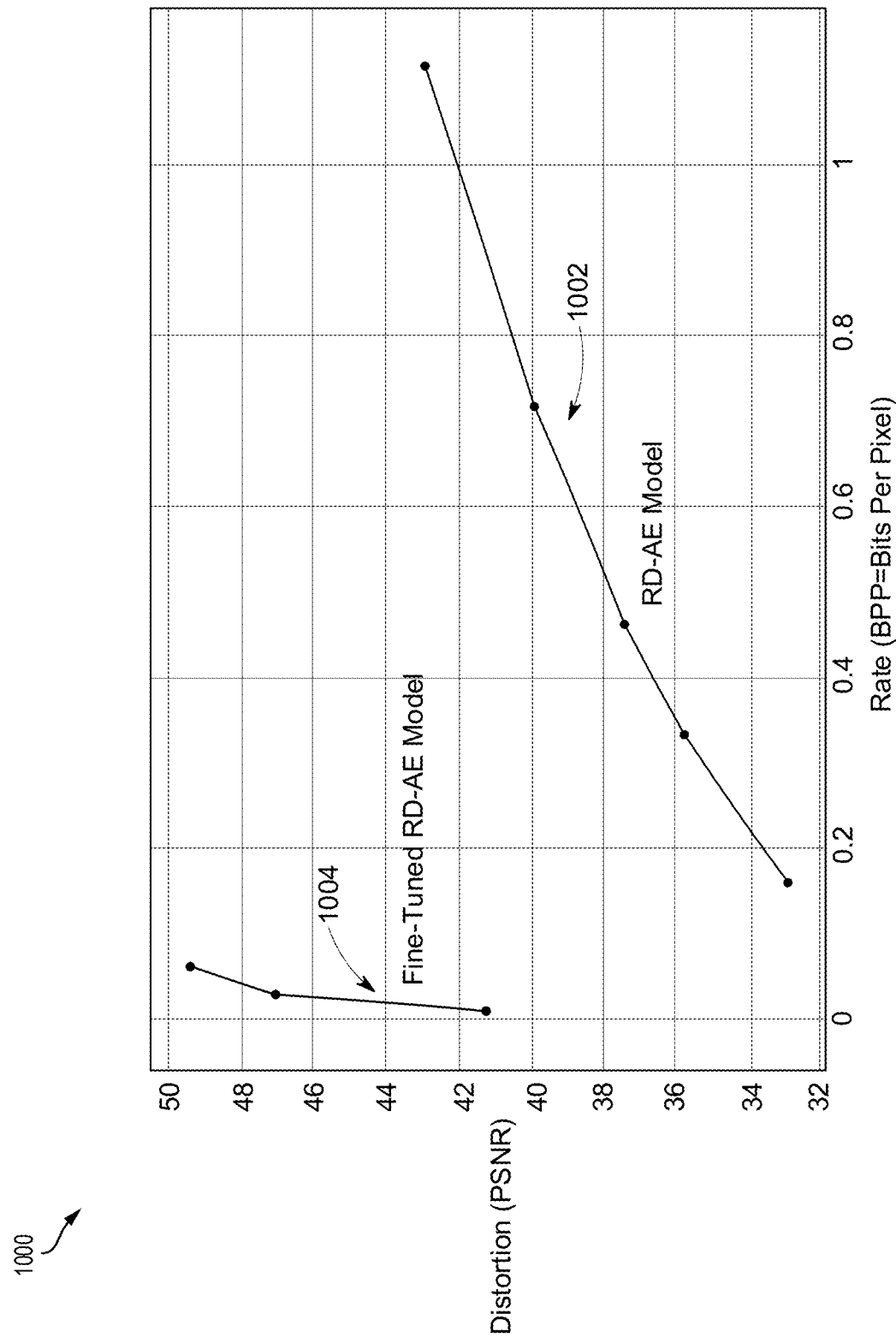
FIG. 10 is a graph illustrating example rate-distortions of an example rate-distortion autoencoder model that is fine-tuned on a datapoint to be transmitted to a receiver and an rate-distortion autoencoder model that is not fine-tuned on the datapoint to be transmitted to the receiver, in accordance with some examples of the present disclosure.

Fine-tuning the neural compression system on the datapoint being sent to and decoded by the receiver, as described above, can provide rate and/or distortion advantages and benefits. FIG. 10 is a graph 1000 illustrating example rate-distortions of an example RD-AE model that is fine-tuned on a datapoint (e.g., an image or frame, a video, audio data, etc.) to be transmitted to a receiver and an RD-AE model that is not fine-tuned on the datapoint to be transmitted to the receiver.

In this example, the graph 1000 illustrates a rate-distortion 1002 of an RD-AE model that is not fine-tuned as described herein, and a rate-distortion 1004 of a fine-tuned RD-AE model. As shown by the rate-distortion 1002 and the rate-distortion 1004, the fine-tuned RD-AE model has a significantly higher compression (rate-distortion) performance over the other RD-AE model.

The RD-AE model associated with the rate-distortion 1004 can be fine-tuned using a datapoint to be compressed and transmitted to a receiver. In some examples, a compression AE can be fine-tuned on a datapoint x as follows:

$\varphi_x^*, \psi_x^*, \theta_x^* = \text{argmin } \mathcal{L}_{RD}(x; \varphi, \psi, \theta)$. In some cases, this can allow high compression (rate-distortion or RID) performance on the datapoint x. The parameters of the fine-tuned prior (e.g., $\psi_x^*$) and the parameters of the fine-tuned decoder (e.g., $\psi_x^*, \theta_x^*$) can be shared with the receiver for use in decoding the bitstream. The receiver can use the fine-tuned prior (e.g., $\psi_x^*$) and the parameters of the fine-tuned decoder (e.g., $\psi_x^*, \theta_x^*$) to decode the bitstream produced by the fine-tuned RD-AE system.

Table 1 below illustrates example tuning details:

TABLE 1

|  |  | Number of Parameters | Number of Bits (16 bit) |
| --- | --- | --- | --- |
| Model Size | Prior | 8.0 million | 16 MB |
| Model Size | Decoder | 2.9 million | 5.8 MB |
| Model Size | Transmission | 10.9 million | 21.8 MB |

TABLE 1-continued

|  | Number of Parameters | Number of Bits (16 bit) |
|---|---|---|
| Size | | |
| Image Size | 1600 × 1216 pixels | |
| Overhead In Rate To Transmit Fine-tuned Model Parameters | 89 bpp (bits per pixel) | |

The tuning details in Table 1 are merely illustrative examples. One of ordinary skill in the art will recognize that other examples can include more, less, same and/or different tuning details.

Figure 11:
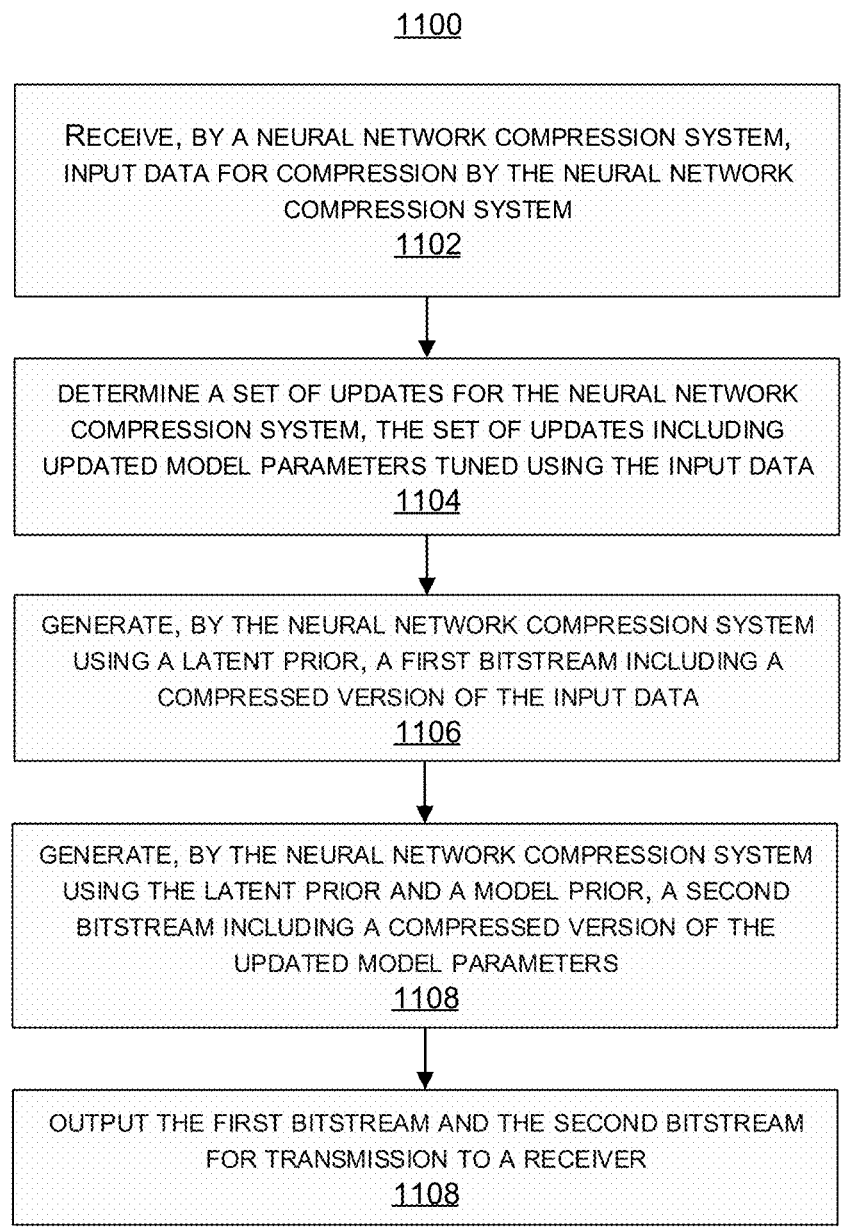
FIG. 11 is a flowchart illustrating an example process 1100 for instance-adaptive compression using a neural network compression system adapted to (e.g., fine-tuned for) input data being compressed, in accordance with some examples of the present disclosure.

FIG. 11 is a flowchart illustrating an example process 1100 for instance-adaptive compression using a neural network compression system (e.g., neural network compression system 500, neural network compression system 600, neural network compression system 700, neural network compression system 800, neural network compression system 900) adapted to input data being compressed.

At block 1102, the process 1100 can include receiving, by a neural network compression system, input data for compression by the neural network compression system. The neural network compression system can be trained on a training dataset (e.g., training dataset 602 of FIG. 6). In some examples, the neural network compression system can include global model parameters $\{\emptyset_D, \theta_D\}$ pretrained on a training set D (e.g., the training dataset). The input data can include image data, video data, audio data, and/or any other data.

At block 1104, the process 1100 can include determining a set of updates for the neural network compression system. In some examples, the set of updates can include updated model parameters (e.g., model parameter updates ($\theta$) and/or quantized model parameter updates ($\tilde{\delta}$)) tuned using the input data.

In some examples, determining the set of updates for the neural network compression system can include processing (e.g., coding) the input data at the neural network compression system; determining one or more losses (e.g., an RDM loss) for the neural network compression system based on the processed input data; and tuning model parameters of the neural network compression system based on the one or more losses. The tuned model parameters can include the set of updates for the neural network compression system.

In some examples, the one or more losses can include a rate loss associated with a rate for sending the compressed version of the input data based on a size of the first bitstream, a distortion loss associated with a distortion between the input data and reconstructed data generated from the compressed version of the input data, and model rate loss associated with a rate for sending the compressed version of the updated model parameters based on a size of the second bitstream. In some cases, the one or more losses can be calculated using Equation 2 described above.

At block 1106, the process 1100 can include generating, by the neural network compression system using a latent prior (e.g., latent prior 506, latent prior 622, latent prior 708, latent prior 806, latent prior 910), a first bitstream (e.g., bitstream 510, bitstream 520, bitstream 710, bitstream 810, bitstream 916) including a compressed version of the input data. In some examples, the first bitstream can be generated by encoding the input data into a latent space representation and entropy encoding the latent space representation.

At block 1108, the process 1100 can include generating, by the neural network compression system using the latent prior and a model prior (e.g., model prior 714, model prior 816, model prior 912, model prior p[$\tilde{\delta}$]), a second bitstream (e.g., bitstream 510, bitstream 520, bitstream 712, bitstream 811, bitstream 918) including a compressed version of the updated model parameters (e.g., quantized model parameter updates ($\tilde{\delta}$)).

In some examples, the model prior can include an independent Gaussian network prior, an independent Laplace network prior, and/or an independent Spike and Slab network prior.

In some cases, generating the second bitstream can include entropy encoding, by the neural network compression system, the latent prior using the model prior; and entropy encoding, by the neural network compression system, the updated model parameters using the model prior.

In some cases, the updated model parameters can include neural network parameters such as, for example, weights, biases, etc. In some examples, the updated model parameters can include one or more updated parameters of a decoder model. The one or more updated parameters can be tuned using the input data (e.g., tuned/adjusted to reduce one or more losses for the input data).

In some examples, the updated model parameters can include one or more updated parameters of an encoder model. The one or more updated parameters can be tuned using the input data. In some cases, the first bitstream can be generated by the neural network compression system using the one or more updated parameters.

In some examples, generating the second bitstream can include encoding, by the neural network compression system using the one or more updated parameters, the input data into a latent space representation of the input data; and entropy encoding, by the neural network compression system using the latent prior, the latent space representation into the first bitstream.

At block 1110, the process 1100 can include outputting the first bitstream and the second bitstream for transmission to a receiver. In some examples, the receiver can include a decoder (e.g., decoder 514, decoder 610, decoder 718, decoder 814, decoder 922). In some examples, the second bitstream can also include a compressed version of the latent prior and a compressed version of the model prior.

In some cases, the process 1100 can further include generating a concatenated bitstream including the first bitstream and the second bitstream, and sending the concatenated bitstream to the receiver. For example, the neural network compression system can concatenate the first bitstream and the second bitstream and send the concatenated bitstream to the receiver. In other cases, the process 1100 can include sending the first bitstream and the second bitstream separately to the receiver.

In some cases, the process 1100 can include generating model parameters of the neural network compression system based on the training dataset, tuning the model parameters of the neural network compression system using the input data, and determining the set of updates based on a difference between the model parameters and the tuned model parameters. In some examples, the model parameters can be tuned based on the input data, a bit size of the compressed version of the input data, a bit size of the set of updates, and a distortion between the input data and reconstructed data generated from the compressed version of the input data.

In some cases, the model parameters can be tuned based on the input data and a ratio of a cost of sending the set of updates and a distortion between the input data and reconstructed data generated from the compressed version of the input data (e.g., a rate/distortion ratio). In some examples, the cost can be based on a bit size of the set of updates. In some examples, tuning the model parameters can include adding/including one or more parameters in the tuned model parameters based on a determination that adding/including the one or more parameters in the tuned model parameters is accompanied by a decrease in a bit size of the compressed version of the input data and/or a distortion between the input data and reconstructed data generated from the compressed version of the input data.

In some examples, the receiver can include a decoder (e.g., decoder 514, decoder 610, decoder 718, decoder 814, decoder 922). In some cases, the process 1100 can include receiving, by the encoder, data including the first bitstream and the second bitstream. In some cases, the process 1100 can further include decoding, by the decoder, the compressed version of the set of updated parameters based on the second bitstream, and generating, by the decoder using the set of updated parameters, a reconstructed version of the input data based on the compressed version of the input data in the first bitstream.

In some examples, the process 1100 can include training (e.g., based on the training dataset) the neural network compression system by reducing a rate-distortion and model-rate loss. In some examples, a model-rate reflects a length of a bitstream for sending model updates.

In some examples, the process 1100 can implement Algorithm 1 and/or Algorithm 2 previously described.

Figure 12:
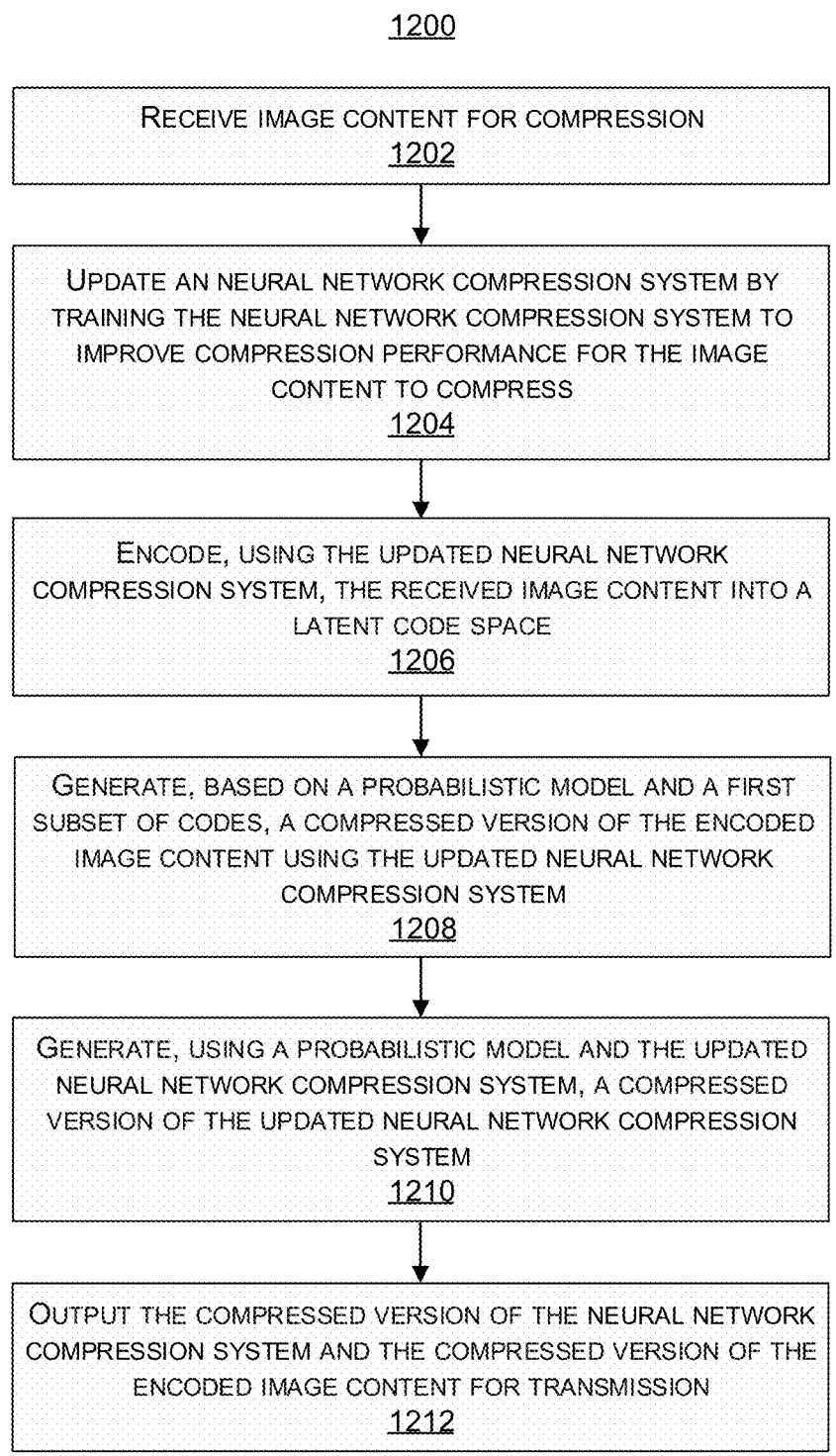
FIG. 12 is a flowchart illustrating an example of a process for compressing one or more images, in accordance with some examples of the present disclosure.

FIG. 12 is a flowchart illustrating an example of a process 1200 for compressing one or more images. At block 1202, the process 1200 can include receiving image content for compression. At block 1204, the process 1200 can include updating a neural network compression system by training the neural network compression system to improve compression performance for the image to compress. In some examples, training the neural network compression system can include training an autoencoder system associated with the neural network compression system.

At block 1206, the process 1200 can include encoding, using the updated neural network compression system, the received image content into a latent space representation.

At block 1208, the process 1200 can include generating, based on a probabilistic model and a first subset of codes, a compressed version of the encoded image content using the updated neural network compression system. The first subset of codes can include a portion of the latent space representation. For example, the latent space representation can be divided into the first subset of codes and one or more additional subsets of codes.

At block 1210, the process 1200 can include generating, using a probabilistic model and the updated neural network compression system, a compressed version of the updated neural network compression system. In some cases, the compressed version of the updated neural network compression system can include quantized parameter updates of the neural network compression system and may exclude non-updated parameters of the neural network compression system.

At block 1212, the process 1200 can include outputting the compressed version of the updated neural network compression system and the compressed version of the encoded image content for transmission. The compressed version of the updated neural network compression system and the compressed version of the encoded image content can be transmitted to a receiver (e.g., a decoder) for decoding. The compressed version of the neural network compression system can include a full model of the neural network compression system or updated model parameters of the neural network compression system.

In some examples, the process 1200 can implement Algorithm 1 previously described.

FIG. 13 is a flowchart illustrating an example of a process 1300 for decompressing one or more images using the techniques described herein. At block 1302, the process 1300 includes receiving a compressed version of an updated neural network compression system (and/or one or more parameters of the neural network compression system) and a compressed version of encoded image content. The compressed version of the updated neural network compression system and the compressed version of the encoded image content can be generated and transmitted as previously described in FIG. 11 or 12. In some cases, the encoded image content can include a first subset of codes of a latent space representation of the image content from which the encoded image content is generated.

In some cases, the compressed version of the updated neural network compression system can include model parameters. In some examples, the model parameters can include updated model parameters and exclude one or more other model parameters.

At block 1304, the process 1300 can include decompressing, using a shared probabilistic model, the compressed version of the updated neural network compression system into an updated neural network compression system model.

At block 1306, the process 1300 can include decompressing, using the updated probabilistic model and the updated neural network compression system model, the compressed version of the encoded image content into a latent space representation.

At block 1308, the process 1300 can include generating reconstructed image content using the updated neural network compression system model and the latent space representation.

At block 1310, the process 1300 can include outputting the reconstructed image content.

In some examples, the process 1300 can implement Algorithm 2 described above.

In some examples, the processes described herein (e.g., process 1100, process 1200, process 1300, and/or other process described herein) may be performed by a computing device or apparatus. In one example, the process 1100 and/or 1200 can be performed by the transmitting device 410 of the system 400 illustrated in FIG. 4. In another example, the process 1100, 1200, and/or 1300 can be performed by a computing device according to the system 400 shown in FIG. 4 or the computing system 1400 shown in FIG. 14.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes 1100, 1200, and 1300. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 1100, 1200, and 1300 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 1100, 1200, and 1300 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 14:
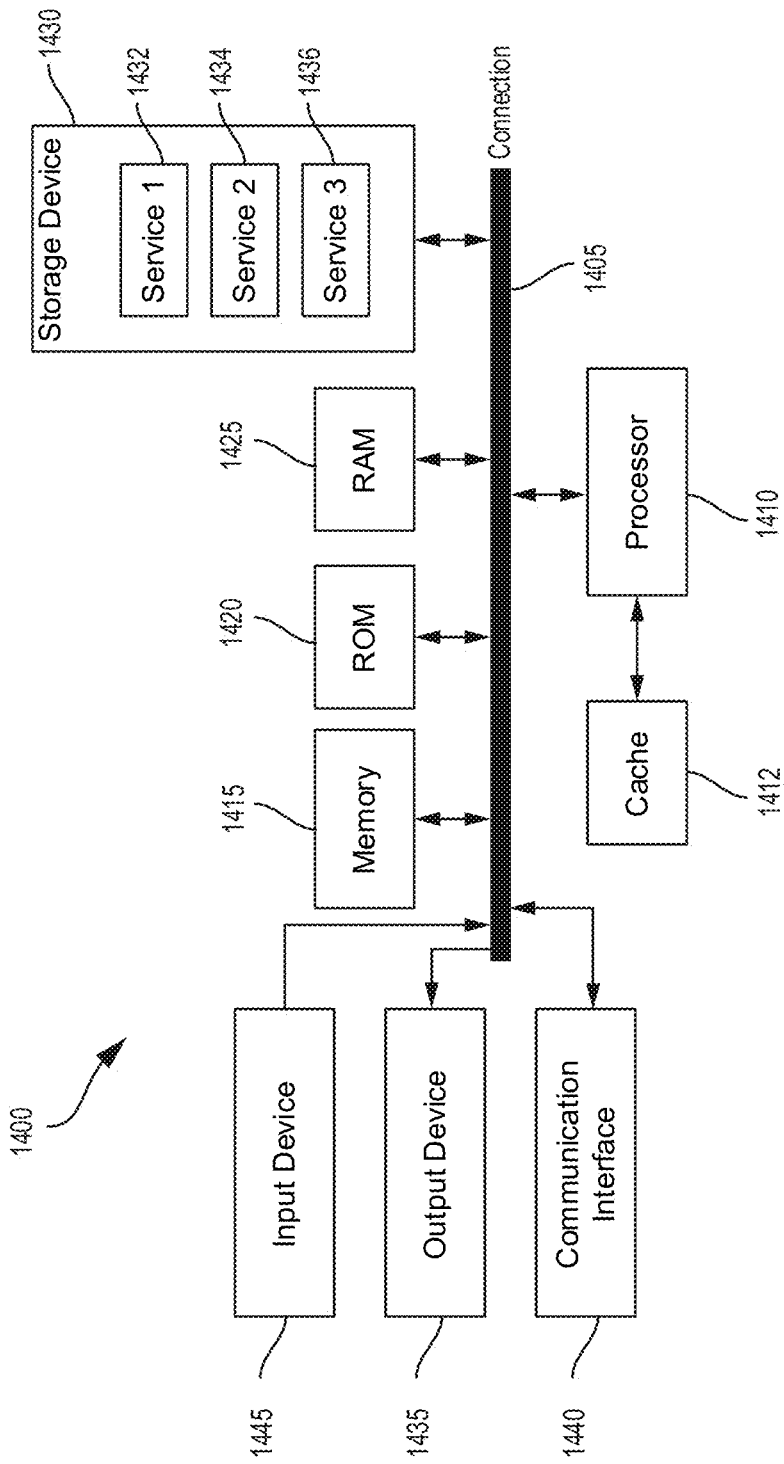
FIG. 14 illustrates an example computing system, in accordance with some examples of the present disclosure.

FIG. 14 is a diagram illustrating an example of a system for implementing certain aspects of the present technology. In particular, FIG. 14 illustrates an example of computing system 1400, which can be for example any computing device making up internal computing system, a remote computing system, a camera, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some embodiments, computing system 1400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may essentially be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, etc. Computing system 1400 can also include output device 1435, which can be one or more of a number of output mechanisms. In some instances, multimodal systems can enable a user to provide multiple types of input/output to communicate with computing system 1400. Computing system 1400 can include communications interface 1440, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memory storage, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some embodiments, a hardware service that performs a particular function can include the software component stored in a computer-readable medium in connection with the necessary hardware components, such as processor 1410, connection 1405, output device 1435, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: An apparatus comprising memory; and one or more processors coupled to the memory, the one or more processors being configured to: receive, by a neural network compression system, input data for compression by the neural network compression system; determine a set of updates for the neural network compression system, the set of updates comprising updated model parameters tuned using the input data; generate, by the neural network compression system using a latent prior, a first bitstream comprising a compressed version of the input data; generate, by the neural network compression system using the latent prior and a model prior, a second bitstream comprising a compressed version of the updated model parameters; and output the first bitstream and the second bitstream for transmission to a receiver.

Aspect 2: The apparatus of Aspect 1, wherein the second bitstream further comprises a compressed version of the latent prior and a compressed version of the model prior.

Aspect 3: The apparatus of any of Aspects 1 to 2, wherein the one or more processors are configured to: generate a concatenated bitstream comprising the first bitstream and the second bitstream; and send the concatenated bitstream to the receiver.

Aspect 4: The apparatus of any of Aspects 1 to 3, wherein, to generate the second bitstream, the one or more processors are configured to: entropy encode, by the neural network compression system, the latent prior using the model prior; and entropy encode, by the neural network compression system, the updated model parameters using the model prior.

Aspect 5: The apparatus of any of Aspects 1 to 4, wherein the updated model parameters comprise one or more updated parameters of a decoder model, the one or more updated parameters being tuned using the input data.

Aspect 6: The apparatus of any of Aspects 1 to 5, wherein the updated model parameters comprise one or more updated parameters of an encoder model, the one or more updated parameters being tuned using the input data, wherein the first bitstream is generated by the neural network compression system using the one or more updated parameters.

Aspect 7: The apparatus of Aspect 6, wherein, to generate the second bitstream, the one or more processors are configured to: encode, by the neural network compression system using the one or more updated parameters, the input data into a latent space representation of the input data; and entropy encode, by the neural network compression system using the latent prior, the latent space representation into the first bitstream.

Aspect 8: The apparatus of any of Aspects 1 to 7, wherein the one or more processors are configured to: generate model parameters of the neural network compression system based on a training dataset used to train the neural network compression system; tune the model parameters of the neural network compression system using the input data; and determine the set of updates based on a difference between the model parameters and the tuned model parameters.

Aspect 9: The apparatus of Aspect 8, wherein the model parameters are tuned based on the input data, a bit size of the compressed version of the input data, a bit size of the set of updates, and a distortion between the input data and reconstructed data generated from the compressed version of the input data.

Aspect 10: The apparatus of Aspect 8, wherein the model parameters are tuned based on the input data and a ratio of a cost of sending the set of updates and a distortion between the input data and reconstructed data generated from the compressed version of the input data, the cost being based on a bit size of the set of updates.

Aspect 11: The apparatus of Aspect 8, wherein, to tune the model parameters, the one or more processors are configured to: include one or more parameters in the tuned model parameters based on a determination that including the one or more parameters in the tuned model parameters is accompanied by a decrease in at least one of a bit size of the compressed version of the input data and a distortion between the input data and reconstructed data generated from the compressed version of the input data.

Aspect 12: The apparatus of any of Aspects 1 to 11, wherein, to determine the set of updates for the neural network compression system, the one or more processors are configured to: process the input data at the neural network compression system; determine one or more losses for the neural network compression system based on the processed input data; and tune model parameters of the neural network compression system based on the one or more losses, the tuned model parameters comprising the set of updates for the neural network compression system.

Aspect 13: The apparatus of Aspect 12, wherein the one or more losses comprise a rate loss associated with a rate for sending the compressed version of the input data based on a size of the first bitstream, a distortion loss associated with a distortion between the input data and reconstructed data generated from the compressed version of the input data, and model rate loss associated with a rate for sending the compressed version of the updated model parameters based on a size of the second bitstream.

Aspect 14: The apparatus of any of Aspects 1 to 13, wherein the receiver comprises an encoder, and wherein the one or more processors are configured to: receive, by the encoder, data comprising the first bitstream and the second bitstream; decode, by the decoder, the compressed version of the updated model parameters based on the second bitstream; and generate, by the decoder using the set of updated parameters, a reconstructed version of the input data based on the compressed version of the input data in the first bitstream.

Aspect 15: The apparatus of any of Aspects 1 to 14, wherein the one or more processors are configured to: train the neural network compression system by reducing a rate-distortion and model-rate loss, wherein a model-rate reflects a length of a bitstream for sending model updates.

Aspect 16: The apparatus of any of Aspects 1 to 16, wherein the model prior comprises at least one of an independent Gaussian network prior, an independent Laplace network prior, and an independent Spike and Slab network prior.

Aspect 17: The apparatus of any of Aspects 1 to 1, wherein the apparatus comprises a mobile device.

Aspect 18: The apparatus of any of Aspects 1 to 1, further comprising a camera configured to capture the input data.

Aspect 19: A method comprising: receiving, by a neural network compression system, input data for compression by the neural network compression system; determining a set of updates for the neural network compression system, the set of updates comprising updated model parameters tuned using the input data; generating, by the neural network compression system using a latent prior, a first bitstream comprising a compressed version of the input data; generating, by the neural network compression system using the latent prior and a model prior, a second bitstream comprising a compressed version of the updated model parameters; and outputting the first bitstream and the second bitstream for transmission to a receiver.

Aspect 20: The method of Aspect 19, wherein the second bitstream further comprises a compressed version of the latent prior and a compressed version of the model prior.

Aspect 21: The method of any of Aspects 19 to 20, wherein the one or more processors are configured to: generating a concatenated bitstream comprising the first bitstream and the second bitstream; and sending the concatenated bitstream to the receiver.

Aspect 22: The method of any of Aspects 19 to 21, wherein generating the second bitstream comprises: entropy encoding, by the neural network compression system, the latent prior using the model prior; and entropy encoding, by the neural network compression system, the updated model parameters using the model prior.

Aspect 23: The method of any of Aspects 19 to 22, wherein the updated model parameters comprise one or more updated parameters of a decoder model, the one or more updated parameters being tuned using the input data.

Aspect 24: The method of any of Aspects 19 to 23, wherein the updated model parameters comprise one or more updated parameters of an encoder model, the one or more updated parameters being tuned using the input data, wherein the first bitstream is generated by the neural network compression system using the one or more updated parameters.

Aspect 25: The method of Aspect 24, wherein generating the second bitstream comprises: encoding, by the neural network compression system using the one or more updated parameters, the input data into a latent space representation of the input data; and entropy encoding, by the neural network compression system using the latent prior, the latent space representation into the first bitstream.

Aspect 26: The method of any of Aspects 19 to 25, wherein the one or more processors are configured to: generating model parameters of the neural network compression system based on a training dataset used to train the neural network compression system; tuning the model parameters of the neural network compression system using the input data; and determining the set of updates based on a difference between the model parameters and the tuned model parameters.

Aspect 27: The method of Aspect 26, wherein the model parameters are tuned based on the input data, a bit size of the compressed version of the input data, a bit size of the set of updates, and a distortion between the input data and reconstructed data generated from the compressed version of the input data.

Aspect 28: The method of Aspect 26, wherein the model parameters are tuned based on the input data and a ratio of a cost of sending the set of updates and a distortion between the input data and reconstructed data generated from the compressed version of the input data, the cost being based on a bit size of the set of updates.

Aspect 29: The method of Aspect 26, wherein tuning the model parameters comprises: including one or more parameters in the tuned model parameters based on a determination that including the one or more parameters in the tuned model parameters is accompanied by a decrease in at least one of a bit size of the compressed version of the input data and a distortion between the input data and reconstructed data generated from the compressed version of the input data.

Aspect 30: The method of any of Aspects 19 to 29, wherein determining the set of updates for the neural network compression system comprises: processing the input data at the neural network compression system; determining one or more losses for the neural network compression system based on the processed input data; and tuning model parameters of the neural network compression system based on the one or more losses, the tuned model parameters comprising the set of updates for the neural network compression system.

Aspect 31: The method of Aspect 30, wherein the one or more losses comprise a rate loss associated with a rate for sending the compressed version of the input data based on a size of the first bitstream, a distortion loss associated with a distortion between the input data and reconstructed data generated from the compressed version of the input data, and model rate loss associated with a rate for sending the compressed version of the updated model parameters based on a size of the second bitstream.

Aspect 32: The method of any of Aspects 19 to 31, wherein the receiver comprises an encoder, and wherein the one or more processors are configured to: receiving, by the encoder, data comprising the first bitstream and the second bitstream; decoding, by the decoder, the compressed version of the updated model parameters based on the second bitstream; and generating, by the decoder using the set of updated parameters, a reconstructed version of the input data based on the compressed version of the input data in the first bitstream.

Aspect 33: The method of any of Aspects 19 to 32, wherein the one or more processors are configured to: training the neural network compression system by reducing a rate-distortion and model-rate loss, wherein a model-rate reflects a length of a bitstream for sending model updates.

Aspect 34: The method of any of Aspects 19 to 33, wherein the model prior comprises at least one of an independent Gaussian network prior, an independent Laplace network prior, and an independent Spike and Slab network prior.

A non-transitory computer-readable medium having stored thereon instructions which, when executed by one or more processors, cause the one or more processors to perform a method according to any of Aspects 19 to 33.

An apparatus comprising means for performing a method according to any of Aspects 19 to 33.

What is claimed is:

1. An apparatus comprising:
memory; and
one or more processors coupled to the memory, the one or more processors being configured to:
receive, by a neural network compression system, input data for compression by the neural network compression system;
determine a set of updates for the neural network compression system, the set of updates comprising one or more updated parameters of an encoder model, the one or more updated parameters being tuned using the input data;
generate, by the neural network compression system using a latent prior and the one or more updated parameters, a first bitstream comprising a compressed version of the input data;
generate, by the neural network compression system using the latent prior and a model prior, a second bitstream comprising a compressed version of the one or more updated parameters; and
output the first bitstream and the second bitstream for transmission to a receiver,
wherein, to generate the second bitstream, the one or more processors are configured to:
encode, by the neural network compression system using the one or more updated parameters, the input data into a latent space representation of the input data; and
entropy encode, by the neural network compression system using the latent prior, the latent space representation into the first bitstream.

2. The apparatus of claim 1, wherein the second bitstream further comprises a compressed version of the latent prior and a compressed version of the model prior.

3. The apparatus of claim 1, wherein the one or more processors are configured to:
generate a concatenated bitstream comprising the first bitstream and the second bitstream; and
send the concatenated bitstream to the receiver.

4. The apparatus of claim 1, wherein, to generate the second bitstream, the one or more processors are configured to:
entropy encode, by the neural network compression system, the latent prior using the model prior; and
entropy encode, by the neural network compression system, the one or more updated parameters using the model prior.

5. The apparatus of claim 1, wherein the one or more processors are configured to:
generate model parameters of the neural network compression system based on a training dataset used to train the neural network compression system;
tune the model parameters of the neural network compression system using the input data; and
determine the set of updates based on a difference between the model parameters and the tuned model parameters.

6. The apparatus of claim 5, wherein the model parameters are tuned based on the input data, a bit size of the compressed version of the input data, a bit size of the set of updates, and a distortion between the input data and reconstructed data generated from the compressed version of the input data.

7. The apparatus of claim 5, wherein the model parameters are tuned based on the input data and a ratio of a cost of sending the set of updates and a distortion between the input data and reconstructed data generated from the compressed version of the input data, the cost being based on a bit size of the set of updates.

8. The apparatus of claim 5, wherein, to tune the model parameters, the one or more processors are configured to:
include one or more parameters in the tuned model parameters based on a determination that including the one or more parameters in the tuned model parameters is accompanied by a decrease in at least one of a bit size of the compressed version of the input data and a distortion between the input data and reconstructed data generated from the compressed version of the input data.

9. The apparatus of claim 1, wherein, to determine the set of updates for the neural network compression system, the one or more processors are configured to:
process the input data at the neural network compression system;
determine one or more losses for the neural network compression system based on the processed input data; and
tune model parameters of the neural network compression system based on the one or more losses, the tuned model parameters comprising the set of updates for the neural network compression system.

10. The apparatus of claim 9, wherein the one or more losses comprise a rate loss associated with a rate for sending the compressed version of the input data based on a size of the first bitstream, a distortion loss associated with a distortion between the input data and reconstructed data generated from the compressed version of the input data, and model rate loss associated with a rate for sending the compressed version of the updated model parameters based on a size of the second bitstream.

11. The apparatus of claim 1, wherein the one or more processors are configured to:
train the neural network compression system by reducing a rate-distortion and model-rate loss, wherein a model-rate reflects a length of a bitstream for sending model updates.

12. The apparatus of claim 1, wherein the model prior comprises at least one of an independent Gaussian network prior, an independent Laplace network prior, and an independent Spike and Slab network prior.

13. The apparatus of claim 1, wherein the apparatus comprises a mobile device.

14. The apparatus of claim 1, further comprising a camera configured to capture the input data.

15. A method comprising:
receiving, by a neural network compression system, input data for compression by the neural network compression system;
determining a set of updates for the neural network compression system, the set of updates comprising one or more updated parameters of an encoder model, the one or more updated parameters being tuned using the input data;
generating, by the neural network compression system using a latent prior and the one or more updated parameters, a first bitstream comprising a compressed version of the input data;
generating, by the neural network compression system using the latent prior and a model prior, a second bitstream comprising a compressed version of the one or more updated parameters; and
outputting the first bitstream and the second bitstream for transmission to a receiver,
wherein generating the second bitstream comprises:
encoding, by the neural network compression system using the one or more updated parameters, the input data into a latent space representation of the input data; and
entropy encoding, by the neural network compression system using the latent prior, the latent space representation into the first bitstream.

16. The method of claim 15, wherein the second bitstream further comprises a compressed version of the latent prior and a compressed version of the model prior.

17. The method of claim 15, wherein the one or more processors are configured to:
generating a concatenated bitstream comprising the first bitstream and the second bitstream; and
sending the concatenated bitstream to the receiver.

18. The method of claim 15, wherein generating the second bitstream comprises:
entropy encoding, by the neural network compression system, the latent prior using the model prior; and
entropy encoding, by the neural network compression system, the one or more updated parameters using the model prior.

19. The method of claim 15, wherein the one or more processors are configured to:
generating model parameters of the neural network compression system based on a training dataset used to train the neural network compression system;
tuning the model parameters of the neural network compression system using the input data; and
determining the set of updates based on a difference between the model parameters and the tuned model parameters.

20. The method of claim 19, wherein the model parameters are tuned based on the input data and at least one of a bit size of the compressed version of the input data, a bit size of the set of updates, a distortion between the input data and reconstructed data generated from the compressed version of the input data, a ratio of a cost of sending the set of updates and the distortion between the input data and reconstructed data generated from the compressed version of the input data, the cost being based on a bit size of the set of updates.

21. The method of claim 19, wherein tuning the model parameters comprises:
including one or more parameters in the tuned model parameters based on a determination that including the one or more parameters in the tuned model parameters is accompanied by a decrease in at least one of a bit size of the compressed version of the input data and a distortion between the input data and reconstructed data generated from the compressed version of the input data.

22. The method of claim 15, wherein determining the set of updates for the neural network compression system comprises:
processing the input data at the neural network compression system;
determining one or more losses for the neural network compression system based on the processed input data; and
tuning model parameters of the neural network compression system based on the one or more losses, the tuned model parameters comprising the set of updates for the neural network compression system,
wherein the one or more losses comprise a rate loss associated with a rate for sending the compressed version of the input data based on a size of the first bitstream, a distortion loss associated with a distortion between the input data and reconstructed data generated from the compressed version of the input data, and model rate loss associated with a rate for sending the compressed version of the updated model parameters based on a size of the second bitstream.

23. A non-transitory, computer-readable medium having stored thereon instructions which, when executed by one or more processors, cause the one or more processors to:
receive, by a neural network compression system, input data for compression by the neural network compression system;
determine a set of updates for the neural network compression system, the set of updates comprising one or more updated parameters of an encoder model, the one or more updated parameters being tuned using the input data;
generate, by the neural network compression system using a latent prior and the one or more updated parameters, a first bitstream comprising a compressed version of the input data;
generate, by the neural network compression system using the latent prior and a model prior, a second bitstream comprising a compressed version of the one or more updated parameters; and
output the first bitstream and the second bitstream for transmission to a receiver,
wherein, to generate the second bitstream, the instructions cause the one or more processors to further:
encode, by the neural network compression system using the one or more updated parameters, the input data into a latent space representation of the input data; and
entropy encode, by the neural network compression system using the latent prior, the latent space representation into the first bitstream.

24. The non-transitory, computer-readable medium of claim 23, wherein the second bitstream further comprises a compressed version of the latent prior and a compressed version of the model prior.

25. The non-transitory, computer-readable medium of claim 23, wherein the instructions further cause the one or more processors to:
generate a concatenated bitstream comprising the first bitstream and the second bitstream; and
send the concatenated bitstream to the receiver.

26. The non-transitory, computer-readable medium of claim 23, wherein, to generate the second bitstream, the instructions further cause the one or more processors to:
entropy encode, by the neural network compression system, the latent prior using the model prior; and
entropy encode, by the neural network compression system, the one or more updated parameters using the model prior.

27. The non-transitory, computer-readable medium of claim 23, wherein the instructions further cause the one or more processors to:
generate model parameters of the neural network compression system based on a training dataset used to train the neural network compression system;
tune the model parameters of the neural network compression system using the input data; and
determine the set of updates based on a difference between the model parameters and the tuned model parameters.

28. The non-transitory, computer-readable medium of claim 27, wherein the model parameters are tuned based on the input data, a bit size of the compressed version of the input data, a bit size of the set of updates, and a distortion between the input data and reconstructed data generated from the compressed version of the input data.

29. The non-transitory, computer-readable medium of claim 27, wherein the model parameters are tuned based on the input data and a ratio of a cost of sending the set of updates and a distortion between the input data and reconstructed data generated from the compressed version of the input data, the cost being based on a bit size of the set of updates.

30. The non-transitory, computer-readable medium of claim 27, wherein, to tune the model parameters, the instructions further cause the one or more processors to:
include one or more parameters in the tuned model parameters based on a determination that including the one or more parameters in the tuned model parameters is accompanied by a decrease in at least one of a bit size of the compressed version of the input data and a distortion between the input data and reconstructed data generated from the compressed version of the input data.

31. The non-transitory, computer-readable medium of claim 23, wherein, to determine the set of updates for the neural network compression system, the instructions further cause the one or more processors to:
process the input data at the neural network compression system;
determine one or more losses for the neural network compression system based on the processed input data; and
tune model parameters of the neural network compression system based on the one or more losses, the tuned model parameters comprising the set of updates for the neural network compression system.

32. The non-transitory, computer-readable medium of claim 31, wherein the one or more losses comprise a rate loss associated with a rate for sending the compressed version of the input data based on a size of the first bitstream, a distortion loss associated with a distortion between the input data and reconstructed data generated from the compressed version of the input data, and model rate loss associated with a rate for sending the compressed version of the updated model parameters based on a size of the second bitstream.

33. The non-transitory, computer-readable medium of claim 23, wherein the instructions further cause the one or more processors to:
   train the neural network compression system by reducing a rate-distortion and model-rate loss, wherein a model-rate reflects a length of a bitstream for sending model updates.

\* \* \* \* \*